(12) United States Patent
Fukuhara et al.

(10) Patent No.: US 12,147,970 B2
(45) Date of Patent: Nov. 19, 2024

(54) IC CARD, PROCESSING METHOD, AND INFORMATION PROCESSING SYSTEM

(71) Applicant: SONY CORPORATION, Tokyo (JP)

(72) Inventors: Hiroshige Fukuhara, Tokyo (JP); Tsutomu Nakatsuru, Tokyo (JP); Masaki Nakamura, Saitama (JP)

(73) Assignee: SONY CORPORATION, Tokyo (JP)

( * ) Notice: Subject to any disclaimer, the term of this patent is extended or adjusted under 35 U.S.C. 154(b) by 490 days.

(21) Appl. No.: 17/264,082

(22) PCT Filed: Aug. 8, 2019

(86) PCT No.: PCT/JP2019/031436
§ 371 (c)(1),
(2) Date: Jan. 28, 2021

(87) PCT Pub. No.: WO2020/049951
PCT Pub. Date: Mar. 12, 2020

(65) Prior Publication Data
US 2021/0374718 A1 Dec. 2, 2021

(30) Foreign Application Priority Data
Sep. 4, 2018 (JP) ................................. 2018-165202

(51) Int. Cl.
*G06Q 20/34* (2012.01)
*H04L 9/08* (2006.01)
*H04L 9/30* (2006.01)

(52) U.S. Cl.
CPC ......... *G06Q 20/341* (2013.01); *H04L 9/0861* (2013.01); *H04L 9/30* (2013.01)

(58) Field of Classification Search
None
See application file for complete search history.

(56) References Cited

U.S. PATENT DOCUMENTS

| 6,792,536 B1 * | 9/2004 | Teppler | G06F 21/64 726/32 |
| 2004/0039919 A1 * | 2/2004 | Takayama | G06Q 20/24 713/180 |

(Continued)

FOREIGN PATENT DOCUMENTS

| CA | 2313583 C * | 2/2008 | ......... G06F 13/4068 |
| CN | 101183938 A * | 5/2008 | ........... G06Q 20/065 |

(Continued)

OTHER PUBLICATIONS

Google Patents English Language Translation of CN-101183938-A. https://patents.google.com/patent/CN101183938A/en?oq=CN+101183938+A (Year: 2023).*

(Continued)

*Primary Examiner* — Ayal I. Sharon
(74) *Attorney, Agent, or Firm* — Paratus Law Group, PLLC

(57) ABSTRACT

Provided is an IC card (100) including a communication unit (102) that performs communication with an external device, a storage unit (104) that has tamper resistance, and that stores key information indicating a private key forming a pair with a public key or a seed value for generating the private key, and a processing unit (110) that, on the basis of object data to be recorded in a P2P database acquired from the external device by communication at the communication unit, and the private key corresponding to the key information, performs control to generate signature data corresponding to the object data, and transmits data including the generated signature data to the external device by communication at the communication unit.

17 Claims, 16 Drawing Sheets

(56) References Cited

U.S. PATENT DOCUMENTS

| | | | |
|---|---|---|---|
| 2008/0034092 A1 | | 2/2008 | Kikuchi |
| 2019/0173667 A1 | | 6/2019 | Wang et al. |
| 2022/0351188 A1* | | 11/2022 | Fukuhara .................. H04L 9/50 |

FOREIGN PATENT DOCUMENTS

| | | | | | |
|---|---|---|---|---|---|
| CN | 101237323 | A | * | 8/2008 | |
| CN | 100474427 | C | * | 4/2009 | ............ G06F 21/10 |
| CN | 102246455 | A | | 11/2011 | |
| CN | 104077688 | A | | 10/2014 | |
| CN | 104182875 | A | * | 12/2014 | ............ G06Q 20/16 |
| CN | 107005574 | A | | 8/2017 | |
| EP | 0936584 | A2 | * | 8/1999 | ............... G07F 7/10 |
| JP | H1093550 | A | | 4/1998 | |
| JP | 2001313714 | A | | 11/2001 | |
| JP | 2002-311829 | A | | 10/2002 | |
| JP | 3788572 | B2 | * | 6/2006 | |
| JP | 4190713 | B2 | * | 12/2008 | ........ G06K 9/00154 |
| JP | 2013-098808 | A | | 5/2013 | |
| JP | 2013175040 | A | * | 9/2013 | |
| JP | 2016-224849 | A | | 12/2016 | |
| JP | 2018-078499 | A | | 5/2018 | |
| KR | 20050020456 | A | | 3/2005 | |
| WO | WO 2005/099168 | A1 | | 10/2005 | |
| WO | WO-2006008895 | A1 | * | 1/2006 | ............ G06Q 20/06 |
| WO | WO-2019020824 | A1 | * | 1/2019 | ........... G06Q 20/065 |
| WO | WO-2019043466 | A1 | * | 3/2019 | ........... G06Q 20/065 |
| WO | WO-2021010766 | A1 | * | 1/2021 | ............ H04L 9/0825 |
| WO | WO-2022208599 | A1 | * | 10/2022 | ............ G06Q 20/06 |

OTHER PUBLICATIONS

Google Patents English Language Translation of WO-2019043466-A1. https://patents.google.com/patent/WO2019043466A1/en?oq=WO-2019043466-A1 (Year: 2023).*

Google Patents English Language Translation of WO-2021010766-A1. https://patents.google.com/patent/WO2021010766A1/en?oq=WO-2021010766-A1 (Year: 2023).*

Google Patents English Language Translation of JP-2001344537-A. https://patents.google.com/patent/JP2001344537A/en?oq=JP-2001344537-A (Year: 2023).*

Google Patents English Language Translation of WO-2022208599-A1. https://patents.google.com/patent/WO2022208599A1/en?oq=WO-2022208599-A1 (Year: 2023).*

Google Patents English Language Translation of WO-2006008895-A1. https://patents.google.com/patent/WO2006008895A1/en?oq=WO-2006008895-A1 (Year: 2023).*

Google Patents English Language Translation of CN 104182875 A, printed on Dec. 21, 2023. https://patents.google.com/patent/CN104182875A/en?oq=CN+104182875+A (Year: 2023).*

Google Patents English Language Translation of JP 2013175040 A, printed on Dec. 21, 2023. https://patents.google.com/patent/JP2013175040A/en?oq=JP+2013175040+A (Year: 2023).*

Google Patents English Language Translation of CN 100474427 C, printed on Dec. 21, 2023. https://patents.google.com/patent/CN100474427C/en?oq=CN+100474427+C (Year: 2023).*

Google Patents English Language Translation of JP 4190713 B2, printed on Dec. 21, 2023. https://patents.google.com/patent/JP4190713B2/en?oq=JP+4190713+B2 (Year: 2023).*

Google Patents English Language Translation of CN 101237323 A, printed on Dec. 21, 2023. https://patents.google.com/patent/CN101237323A/en?oq=CN+101237323+A (Year: 2023).*

Google Patents English Language Translation of JP 3788572 B2, printed on Dec. 21, 2023. https://patents.google.com/patent/JP3788572B2/en?oq=JP+3788572+B2 (Year: 2023).*

Gao Liwei, "Design and implementation of the Certificate Issuing System for Financial IC Card" China Master's Theses, Beijing Jiaotong University, May 15, 2015, pp. 1-86.

Yoichi Komano, et al, Toshiba Corporation, "Built-in Determined Sub-Key Correlation Power Analysis", Leading Innovation Dec. 31, 2011, pp. 1-11.

* cited by examiner

IC CARD, PROCESSING METHOD, AND INFORMATION PROCESSING SYSTEM

CROSS REFERENCE TO PRIOR APPLICATION

This application is a National Stage Patent Application of PCT International Patent Application No. PCT/JP2019/031436 (filed on Aug. 8, 2019) under 35 U.S.C. § 371, which claims priority to Japanese Patent Application No. 2018-165202 (filed on Sep. 4, 2018), which are all hereby incorporated by reference in their entirety.

TECHNICAL FIELD

The present disclosure relates to an IC card, a processing method, and an information processing system.

BACKGROUND ART

Technology relating to an IC (Integrated Circuit) card that stores a private key has been developed. An example of the above technology is technology described in the following PTL 1.

CITATION LIST

Patent Literature

[PTL 1]
JP 2018-78499 A

SUMMARY

Technical Problem

In recent years, usage of distributed file systems using P2P (Peer to Peer) networks such as blockchains is growing. Usage of distributed file systems using P2P networks yields the following advantages, for example. Hereinafter, distributed file systems using P2P networks will be referred to as "P2P database".

Tampering and destroying are difficult
No need for central administration (basically anyone can participate)
Transparency is high (basically anyone can browse records)
Costs are low (no need for expensive system)

For example, in a case of a P2P database being used, signature data is attached to object data that is the object of recording in the P2P database (i.e., an electronic signature is affixed to this object data). Attaching the signature data to the object data and verifying this signature data yields the advantages of affixing electronic signatures, such as proof of non-tampering of the object data. Accordingly, even in a case in which the P2P database is used for transaction of virtual currency data, for example, the legitimacy of the transaction is ensured.

Now, signature data is generated using a public key cryptosystem, using a private key that makes up a pair with a public key. In a case of the private key being leaked, or a seed value for generating the private key being leaked, signature data can be generated from the leaked private key or from a private key generated from the leaked seed value. And it is difficult to "identify, from signature data, whether or not the signature data is signature data generated from a leaked private key or from a private key generated from a leaked seed value". Accordingly, there is demand for "a method enabling signature data corresponding to object data that is the object of recording in a P2P database to be generated, while preventing leakage of a private key, or a seed value for generating a private key". In the following, data indicating a private key or a seed value for generating a private key will be referred to as "key information".

In the present disclosure, a new and improved IC card, a processing method, and an information processing system, capable of generating signature data corresponding to object data that is the object of recording in a P2P database while preventing leakage of key information, are proposed.

Solution to Problem

According to the present disclosure provided is an IC card including a communication unit that performs communication with an external device, a storage unit that has tamper resistance, and that stores key information indicating a private key forming a pair with a public key or a seed value for generating the private key, and a processing unit that, on the basis of object data to be recorded in a P2P database acquired from the external device by communication at the communication unit, and the private key corresponding to the key information, performs control to generate signature data corresponding to the object data, and transmits data including the generated signature data to the external device by communication at the communication unit.

Also, according to the present disclosure, provided is a processing method executed by an IC card. The method includes a step of performing communication with an external device, a step of generating, on the basis of object data to be recorded. in a P2P database acquired from the external device by communication in the step of performing communication, and a private key corresponding to key information indicating the private key forming a pair with a public key or a seed value for generating the private key that is stored in a storage medium that has tamper resistance, signature data corresponding to the object data, and a step performing control to transmit data including the signature data generated in the step of generating, to the external device, by communication in the step of performing communication.

Also, according to the present disclosure, provided is an information processing system including an IC card, and an information processing device that verifies content of object data to be recorded. in a P2P database, and generates predetermined signature data in accordance with a verification result. The IC card includes a communication unit that performs communication with an external device, a storage unit that has tamper resistance, and that stores key information indicating a private key forming a pair with a public key or a seed value for generating the private key, and a processing unit that, on the basis of the object data acquired from the external device by communication at the communication unit, and the private key corresponding to the key information, performs control to generate signature data corresponding to the object data, and transmits data including the generated signature data to the external device by communication at the communication unit. The processing unit determines whether a signature condition relating to verification of the predetermined signature data corresponding to the information processing device is satisfied, and generates the signature data corresponding to the object data in a case of determining that the signature condition is satisfied.

Advantageous Effects of Invention

According to the present disclosure, signature data corresponding to object data that is the object of recording in a P2P database can be generated while preventing leakage of key information.

Note that the above advantageous effects are not necessarily limiting, and any one of advantageous effects described in the present specification, or other advantageous effects that can be comprehended from the present specification, may be yielded along with the above-described advantageous effects or instead of the above-described advantageous effects.

DESCRIPTION OF EMBODIMENTS

Preferred embodiments of the present disclosure will be described below with reference to the attached figures. Note that components in the present specification and the figures that have substantially the same functional configuration are denoted by the same reference signs, and repetitive description will be omitted.

Also, description will be made below according to the following order.
1. Information Processing System According to Present Embodiment
   [1] Information Processing System According to Present Embodiment
     [1] Configuration of Information Processing System According to Present Embodiment
       [1-1] IC card
       [1-2] Reader
       [1-3] Server (Information Processing Device)
       [1-4] Application Examples of Devices Configuring Information Processing System According to Present Embodiment
     [2] Processing of Information Processing System According to Present Embodiment
       [2-1] First Example of Processing in Information Processing System
       [2-2] Second Example of Processing in Information Processing System
       [2-3] Third Example of Processing in Information Processing System
       [2-4] Fourth Example of Processing in Information Processing System
       [2-5] Fifth Example of Processing in Information Processing System
       [2-6] Sixth Example of Processing in Information Processing System
       [2-7] Other Examples of Processing in Information Processing System
2. Program According to Present Embodiment

1. INFORMATION PROCESSING SYSTEM ACCORDING TO PRESENT EMBODIMENT

[1] CONFIGURATION OF INFORMATION PROCESSING SYSTEM ACCORDING TO PRESENT EMBODIMENT

Figure 1:
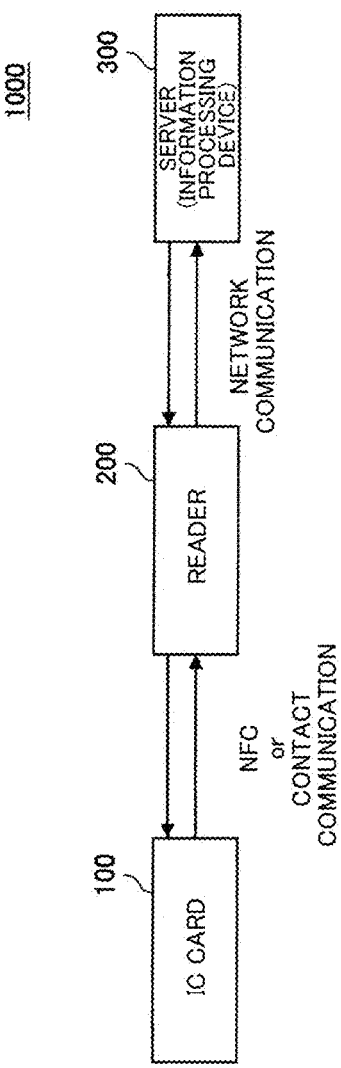
FIG. 1 is an explanatory diagram illustrating an example of a configuration of an information processing system according to the present embodiment.

FIG. 1 is an explanatory diagram illustrating an example of a configuration of an information processing system 1000 according to the present embodiment. The information processing system 1000 has, for example, an IC card 100, a reader 200, and a server 300 (information processing device).

Note that the configuration of the information processing system according to the present embodiment is not limited to the example illustrated in FIG. 1. For example, the information processing system according to the present embodiment may have a plurality of IC cards 100. Also, the information processing system according to the present embodiment may have a plurality of readers 200, and may have a plurality of servers 300. Also, in the information processing system according to the present embodiment, the server 300 may have the function of the reader 200, and in this case, the information processing system according to the present embodiment does not need to have the reader 200. Also, in the information processing system according to the present embodiment, the IC card 100 may have the function of the reader 200, and in this case, the information processing system according to the present embodiment does not need to have the reader 200.

The reader 200 is a device that has functions of performing communication with the IC card 100 and reading data out from the IC card 100. The reader 200 corresponds to an example of an external device of the IC card 100, capable of reading data out from the IC card 100. Note that the reader 200 may further have functions of writing data to the IC card 100. In a case of the reader 200 further having functions of writing data to the IC card 100, the reader 200 functions as a reader/writer.

The IC card 100 and the reader 200 (an example of an external device of the IC card 100. The same applies hereinafter.) perform wireless communication (close proximity wireless communication) by communication by NFC (Near Field Communication) such as Type-A, Type-B, Type-F, and so forth, for example. When performing communication between the IC card 100 and the reader 200 by NFC, a user of the IC card 100 can cause the IC card 100 and the reader 200 to perform communication by performing "an operation of moving the IC card 100 into a communicable range of the reader 200 (a so-called touch operation or an operation referred to as a waving operation)". Accordingly, when causing the IC card 100 and the reader 200 to perform communication by NFC, the "load on the user of the IC card 100 regarding the operation to cause the IC card 100 to perform communication" is relatively small.

Note that in the information processing system according to the present embodiment, the IC card 100 and the reader 200 may perform communication by, for example, "wireless communication by an optional communication system, such as wireless communication using IEEE 802.15.1 such as BLE (Bluetooth (registered trademark) Low Energy) or the like, wireless communication using IEEE 802.11, infrared communication, and so forth".

The IC card 100 and the reader 200 may also perform wired communication by contact communication through external contact terminals, such as communication via a communication interface based on the ISO 7816 standard, for example. In a case of the IC card 100 and the reader 200 performing contact communication, the user of the IC card 100 can cause the IC card 100 and the reader 200 to perform communication by performing "an operation of bringing an external contact terminal that the IC card 100 is provided with into contact with an external contact terminal that the reader 200 is provided with". Accordingly, in a case in which the IC card 100 and the reader 200 perform contact communication, "load on the user of the IC card 100 regarding the operation to cause the IC card 100 to perform communication" is relatively small.

Note that examples of wired communication are not limited to contact communication via external contact terminals, and optional wired communication such as communication via USB (Universal Serial Bus) and so forth may be performed.

The server 300 and the reader 200 are connected wirelessly or wired via a network, for example, and perform communication by communication via this network (hereinafter, referred to as "network communication"). Examples of networks according to the present embodiment include wired networks such as LAN (Local Area Network), WAN (Wide Area Network) and so forth, wireless networks such as WLAN (Wireless Local Area Network) and so forth, or the Internet using a communication protocol such as TCP/IP (Transmission Control Protocol/Internet Protocol) or the like, and so forth.

Note that in the information processing system according to the present embodiment, the server 300 and the reader 200 can directly perform communication without going through a network.

The server 300 and the IC card 100 can perform communication via the reader 200. That is to say, in the information processing system 1000, the reader 200 can serve in a role of a relay device that relays communication between the server 300 and the IC card 100.

Note that in the information processing system according to the present embodiment, the server 300 and the IC card 100 can perform communication directly, without going through the reader 200. In a case in which the information processing system according to the present embodiment is "a configuration in which the server 300 and the IC card 100 perform communication directly without going through the reader 200", the server 300 may be configured having the functions of the reader 200, for example. That is to say, the information processing system according to the present embodiment does not need to have a device that serves in the role of a relay device, as with the reader 200.

An example will be given below regarding "a case in which the IC card 100 and the reader 200 perform communication by NFC or contact communication, and the server 300 and the reader 200 perform communication by network communication", as illustrated in FIG. 1. Note that examples of communication in the information processing system according to the present embodiment are not restricted to the example illustrated in FIG. 1, as mentioned above.

[1-1] IC Card 100

Figure 2:
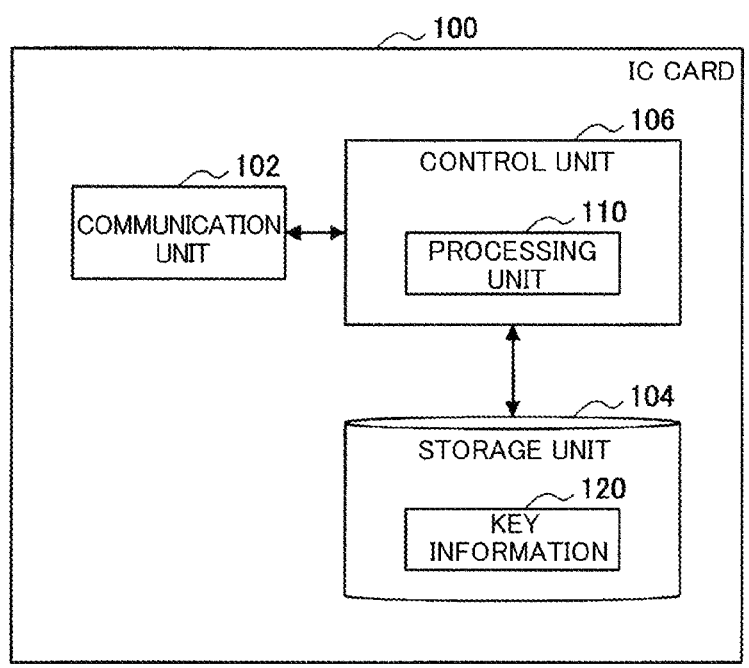
FIG. 2 is a functional block diagram illustrating an example of a configuration of an IC card according to the present embodiment.

FIG. 2 is a functional block diagram illustrating an example of a configuration of the IC card 100 according to the present embodiment.

The IC card 100 is provided with, for example, a communication unit 102, a storage unit 104, and a control unit 106.

Hardware Configuration Example of IC Card 100

Figure 3:
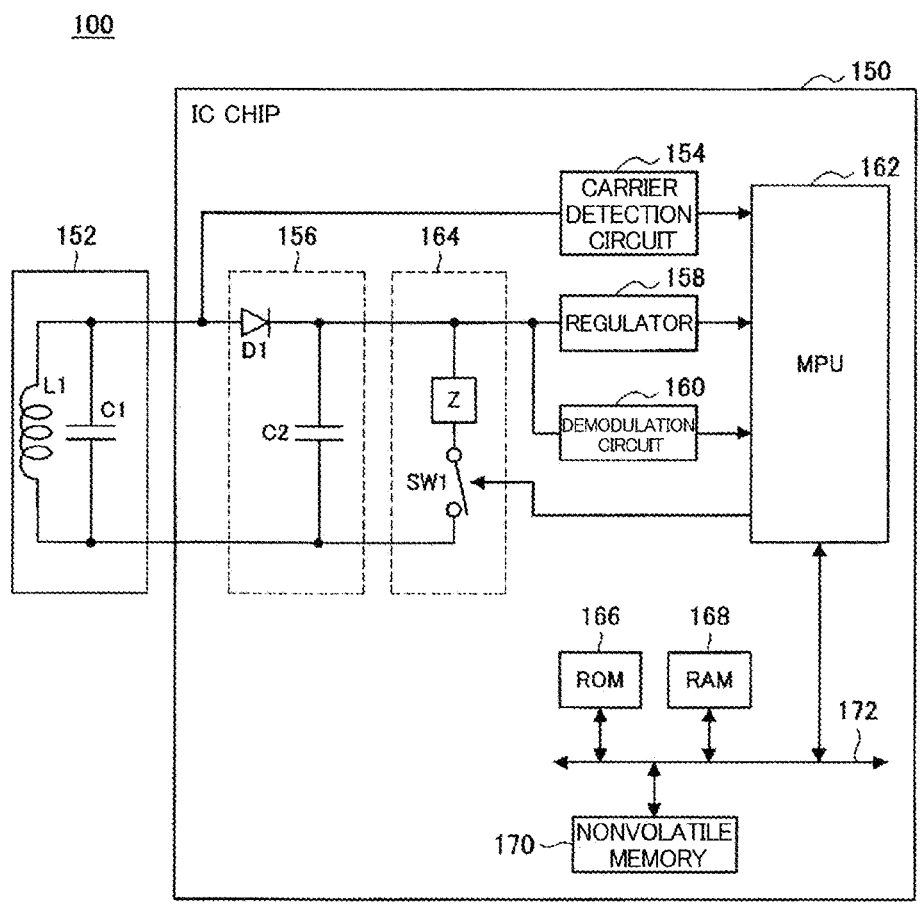
FIG. 3 is an explanatory diagram illustrating an example of a hardware configuration of the IC card according to the present embodiment.

FIG. 3 is an explanatory diagram illustrating an example of a hardware configuration of the IC card 100 according to the present embodiment. FIG. 3 illustrates an example of a hardware configuration of the IC card 100 in a case of performing communication with the reader 200 by communication using NFC.

The IC card 100 is provided with, for example, an IC chip 150 and an antenna 152. The IC chip 150 and the antenna 152 are communication means that the IC card 100 is provided with, and function as the communication unit 102. The IC chip 150 and the antenna 152 perform communication by NFC with an external device such as the reader 200 or the like, with a carrier wave of a predetermined frequency such as 13.56 [MHz] or the like, for example.

Also, the IC chip 150 functions as the storage unit 104 and the control unit 106, which will be described later.

Note that the IC card 100 does not need to have the configuration of the IC chip 150 illustrated in FIG. 3, for example, in the form of an IC chip.

The antenna 152 serves in a role of receiving carrier waves and transmitting response signals.

The antenna 152 is configured of, for example, a resonance circuit that is made up of a coil (inductor) L1 that has a predetermined inductance, and a capacitor C1 that has a predetermined capacitance, and generates inducted voltage by electromagnetic induction in accordance with reception of carrier waves. The antenna 152 then outputs reception voltage in which the inducted voltage is made to resonate at a predetermined resonance frequency. The resonance frequency at the antenna 152 is set in accordance with the frequency of the carrier waves, such as 13.56 [MHz] or the like here, for example. The antenna 152 receives carrier waves by the above-described configuration, and also transmits response signals by load modulation performed at the IC chip 150.

The IC chip 150 serves in a role of demodulating and processing carrier wave signals transmitted from an external device such as the reader 200 or the like, on the basis of the received carrier waves, and transmitting response signals by load modulation.

The IC chip 150 is provided with, for example, a carrier detection circuit 154, a detector circuit 156, a regulator 158, a demodulation circuit 160, an MPU 162, and a load modulation circuit 164. Note that the IC chip 150 may further be provided with a protection circuit (omitted from illustration) that prevents overvoltage or overcurrent from being applied to the MPU 162, for example, although not illustrated in FIG. 3. An example of the protection circuit (omitted from illustration) here is a clamping circuit configured of a diode and so forth, or the like.

The IC chip 150 also is provided with, for example, ROM 166, RAM 168, and nonvolatile memory 170. The MPU 162, the ROM 166, the RAM 168, and the nonvolatile memory 170 are connected by a bus 172, serving as a data transmission path, for example.

The carrier detection circuit 154 generates square detection signals, for example, on the basis of reception voltage transmitted from the antenna 152, and transmits the detection signals to the MPU 162. Also, the MPU 162 uses the above detection signals transmitted thereto as a processing clock for data processing, for example. The above detection signals here are based on reception voltage transmitted from the antenna 152, and accordingly are synchronized with the frequency of the carrier waves transmitted from an external device such as the reader 200. Accordingly, the IC chip 150 can perform processing with an external device such as the reader 200, synchronously with the external device, by being provided with the carrier detection circuit 154.

The detector circuit 156 rectifies the reception voltage output from the antenna 152. The detector circuit 156 here is configured of a diode D1 and a capacitor C2, for example.

The regulator 158 performs smoothing and voltage stabilization of the reception voltage, and outputs drive voltage to the MPU 162. The regulator 158 uses the direct current component of the reception voltage as the drive voltage here.

The demodulation circuit 160 demodulates the carrier wave signals on the basis of the reception voltage, and outputs data (e.g., binarized data signals of high level and low level) corresponding to the carrier wave signals contained in the carrier waves. The demodulation circuit 160 outputs the alternating current component of the reception voltage as data here.

The MPU 162 is driven with the drive voltage output from the regulator 158 as a power source, and performs various types of processing on the data demodulated at the demodulation circuit 160. The MPU 162 functions as the control unit 106.

Also, the MPU 162 generates control signals to control load modulation regarding a response to an external device such as the reader 200 or the like, in accordance with the processing results. The MPU 162 then outputs the control signals to the load modulation circuit 164.

The MPU 162 is configured of one or two or more processors configured of a computing circuit such as an MPU (Micro Processing Unit) or the like, various types of processing circuits, and so forth, for example.

The load modulation circuit 164 is provided with a load Z and a switch SW1, for example, and selectivity connects (enables) the load Z in accordance with control signals transmitted from the MPU 162, thereby performing load modulation. Now, the load Z is configured of a resistance having a predetermined resistance value, for example. Also, the switch SW1 is configured of a p-channel MOSFET (Metal Oxide Semiconductor Field Effect Transistor) or an n-channel MOSFET, for example.

The ROM 166 stores control data, such as programs and computation parameters that the MPU 162 uses. The RAM 168 temporarily stores programs executed by the MPU 162, computation results, execution states, and so forth.

The nonvolatile memory 170 is one recording medium that functions as the storage unit 104, and has tamper resistance. The tamper resistance that the nonvolatile memory 170 has is realized by an optional method that makes physical analysis difficult, such as stored contents being erased under light, the physical layout of storage elements being random, the storage region and data being encrypted, a combination of the above, or the like.

Key information, for example, is stored in the nonvolatile memory 170. The key information according to the present embodiment is data, and indicates a private key that makes up a pair with a public key, or a seed value for generating the private key. That is to say, key information is data indicating a private key that makes up a pair with a public key, or data indicating a seed value for generating a private key. A private key is generated from a seed value by generating a random number sequence from a seed value, and clipping out part of the generated random number sequence, for example. Note that it is needless to say that processing relating to generating a private key on the basis of a seed value is not limited to the example shown above.

Note that various types of data may be stored in the nonvolatile memory 170, such as "data used for processing in the IC card 100, such as history information (described later) and so forth", electronic value (currency or data having value based on currency), data corresponding to various types of services, various types of applications, and so forth. Also, of such data, data regarding which leakage thereof would pose no particular problem with regard to specifications, design, or service, may be stored in another recording medium (omitted from illustration) that does not have tamper resistance, configuring the storage unit 104.

Key information is stored in a safer state in the IC card 100 by the nonvolatile memory 170 configuring the storage unit 104 being a secure recording medium having tamper resistance, and the key information being stored in the nonvolatile memory 170 that is a secure recording medium. Accordingly, prevention of leakage of key information can be implemented in the IC card 100.

Examples of the nonvolatile memory 170 include EEPROM (Electrically Erasable and Programmable Read Only Memory), flash memory, and so forth.

The IC card 100 performs communication with an external device such as the reader 200 by NFC, using carrier waves of a predetermined frequency, by the hardware configuration illustrated in FIG. 3, for example.

Note that the hardware configuration of the IC card 100 is not limited to the configuration illustrated in FIG. 3.

For example, in a case in which the IC card 100 has a configuration for performingc ontact communication with an external device, the IC card 100 has a configuration in which the antenna 152 illustrated in FIG. 3 is replaced by an external contact terminal. Note that it is needless to say that configuration examples capable of performing contact communication are not limited to the above-described example.

Also, the IC card 100 may have a configuration that is provided with a communication device corresponding to a communication system for wired communication or wireless communication. Further, the IC card 100 may have a configuration that is capable of communication by a plurality of communication systems, such as communication by NFC and contact communication, for example.

Referencing FIG. 2 again, an example of the functional configuration of the IC card 100 will be described. The communication unit 102 performs communication with an external device by communication according to a predetermined communication system. Communication at the communication unit 102 is controlled by the control unit 106, for example.

Now, an example of the communication unit 102 is a device that supports communication by NFC, such as the IC chip 150 and the antenna 152 illustrated in FIG. 3. The device that supports communication by NFC may be a CLF (Contactless Front End) or an NFC controller. Note that the communication unit 102 may be a device that supports communication systems other than NFC as well, such as contact communication (wired communication), wireless communication using IEEE 802.15.1, or the like, for example, as described above.

The storage unit 104 is storage means that the IC card 100 is provided with. The storage unit 104 is configured including a recording medium having tampering resistance, and at least key information is stored in the recording medium having tampering resistance. Note that as described above, a recording medium that does not have tampering resistance may be included in the storage unit 104. That is to say, the storage unit 104 serves in the role of "a storage unit having tamper resistance" or "a storage unit having tamper resistance and a storage unit not having tamper resistance". An example of the storage unit 104 is the nonvolatile memory 170 illustrated in FIG. 3 or the like. FIG. 2 illustrates an example in which key information 120 is stored in the storage unit 104. Note that it is needless to say that data stored in the storage unit 104 is not limited to the key information 120.

The control unit 106 is configured of an MPU or the like, for example, and serves in a role of controlling the entire IC card 100. The control unit 106 is also provided with a processing unit 110, for example, and serves in a leading role of performing various types of processing (processing regarding the processing method according to the present embodiment), such as described in examples of processing in the information processing system, which will be described later.

Note that the functional configuration of the IC card 100 is not limited to the configuration illustrated in FIG. 2.

For example, the IC card 100 may be provided with the processing unit 110 illustrated in FIG. 2 separately from the control unit 106 (e.g., realized as a separate processing circuit).

Also, the functional configuration of the IC card 100 is not limited to the configuration illustrated in FIG. 2, and may assume a functional configuration corresponding to sectioning of processing in the IC card 100, which will be described later.

[1-2] Reader 200

The reader 200 is a device having a function of performing communication with the IC card 100 and reading data out from the IC card 100. The reader 200 also serves in a role of a relay device that relays communication between the server 300 and the IC card 100.

Hardware Configuration Example of Reader 200

Figure 4:
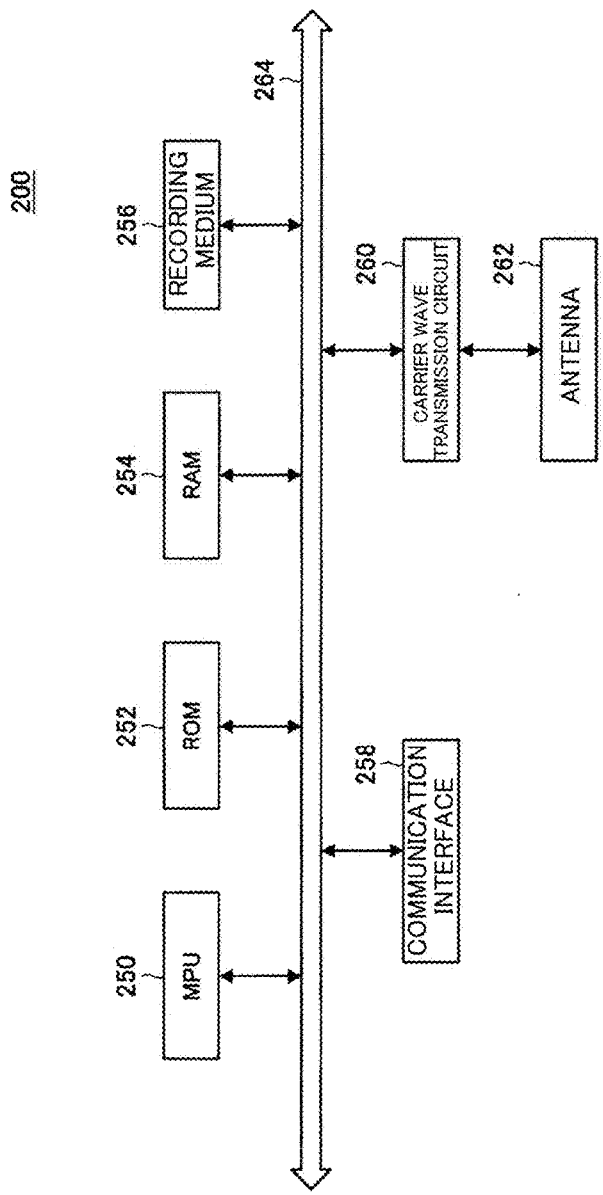
FIG. 4 is an explanatory diagram illustrating an example of a hardware configuration of a reader.

FIG. 4 is an explanatory diagram illustrating an example of a hardware configuration of the reader 200. FIG. 4 illustrates an example of the hardware configuration of the reader 200 in a case of performing communication with the IC card 100 by communication using NFC.

The reader 200 is provided with, for example, an MPU 250, ROM 252, RAM 254, a recording medium 256, a communication interface 258, a carrier wave transmission circuit 260, and an antenna 262. Also, the components of the reader 200 are connected to each other by a bus 264 serving as a data transmission path, for example. Also, the reader 200 is driven by electric power supplied from an internal power source such as a battery or the like that the reader 200 is provided with, or by electric power supplied from an external power source or the like to which the reader 200 is connected, for example.

The MPU 250 is configured of one or two or more processors configured of a computing circuit such as an MPU or the like, various types of processing circuits, and so forth, for example, and functions as a control unit (omitted from illustration) that controls the entire reader 200.

The ROM 252 stores control data and so forth, such as programs and computation parameters and so forth that the MPU 250 uses. The RAM 254 temporarily stores programs executed by the MPU 250 and so forth, for example.

The recording medium 256 functions as a storage unit (omitted from illustration) that stores various types of data, such as various types of applications and so forth, for example. Examples of the recording medium 256 here include magnetic recording media such as a hard disk and so forth, and nonvolatile memory such as flash memory and the like. The recording medium 256 may also be detachably mountable to the reader 200.

The communication interface 258 is communication means that performs communication according to one communication system that the reader 200 is provided with, and performs wireless or wired communication with external devices such as the server 300 or the like via a network (or directly). The communication interface 258 functions as a first communication unit (omitted from illustration) in the reader 200. Examples of the communication interface 258 here include a communication antenna and RF (Radio Frequency) circuit (wireless communication), an IEEE 802.15.1 port and a transmission/reception circuit (wireless communication), an IEEE 802.11 port and a transmission/reception circuit (wireless communication), or a LAN terminal and a transmission/reception circuit (wired communication), and so forth. The communication interface 258 may also have an optional configuration corresponding to the network according to the present embodiment.

The carrier wave transmission circuit 260 and the antenna 262 are communication means performing communication by other communication systems that the reader 200 is provided with, and perform communication with external devices such as the IC card 100 and so forth by NFC. The carrier wave transmission circuit 260 and the antenna 262 function as a second communication unit (omitted from illustration) in the reader 200.

The antenna 262 is configured of, for example, a resonance circuit serving as a transmission/reception antenna that is made up of a coil that has a predetermined inductance and a capacitor that has a predetermined capacitance, and a demodulation circuit. The antenna 262 receives carrier waves of a predetermined frequency, such as 13.56 [MHz] for example, and thereby performs demodulation of data and so forth transmitted from an external device such as the IC card 100 or the like by load modulation or the like. Note that in a case in which the carrier wave transmission circuit 260 is provided with a demodulation circuit, for example, the antenna 262 may be configured of a resonance circuit.

The carrier wave transmission circuit 260 is provided with a modulation circuit that performs modulation such as ASK (Amplitude Shift Keying) or the like, and an amplifying circuit that amplifies output from the modulation circuit, and transmits carrier waves carrying carrier waves signals from the transmission/reception antenna of the antenna 262, for example. The carrier wave transmission circuit 260 may also be provided with a demodulation circuit that demodulates signals received by the antenna 262, for example. The demodulation circuit performs envelope detection of amplitude change in voltage between the modulation circuit (or amplifying circuit) and the resonance circuit of the antenna 262, and binarizes the detected signals, thereby demodulating signals received by the antenna 262, for example. Note that the demodulation circuit can demodulate signals received by the antenna 262 using phase change in voltage between the modulation circuit (or amplifying circuit) and the resonance circuit of the antenna 262, for example.

By being provided with the carrier wave transmission circuit 260, the reader 200 can have initiator functions in NFC and serve in a role of a so-called reader/writer. Various types of signals can be given as examples of carrier wave signals that the carrier wave transmission circuit 260 transmits from the antenna 262 here, such as polling signals, signals indicating various types of requests such as read requests, and so forth. Also, transmission of carrier waves by the carrier wave transmission circuit 260 is controlled by the MPU 250, for example.

By having the hardware configuration illustrated in FIG. 4, for example, the reader 200 has functions of reading data out of the IC card 100, and also serves in a role of a relay device that relays communication between the server 300 and the IC card 100. Note that the hardware configuration of the reader 200 is not limited to the configuration illustrated in FIG. 4.

For example, in a case of performing communication with an external device via an external communication device that has functions similar to the communication interface 258, the reader 200 does not have to be provided with the communication interface 258.

Also, in a case of performing communication with an external device via an external communication device that has functions similar to the carrier wave transmission circuit 260 and the antenna 262, the reader 200 does not have to be provided with the carrier wave transmission circuit 260 and the antenna 262.

Also, in a case of performing communication with an external device by a communication system other than NFC, such as wireless communication using IEEE 802.15.1, contact communication, or the like, the reader 200 does not have to be provided with the carrier wave transmission circuit 260 and the antenna 262. In the above case, the reader 200 performs communication with the external device by being provided with a communication device corresponding to the communication system other than NFC, or by an external communication device corresponding to the communication system other than NFC.

Also, a configuration may be made in which the reader 200 is not provided with the recording medium 256, for example.

Also, the reader 200 may assume a hardware configuration corresponding to later-described application examples of the reader 200, for example. As one example, the reader 200 may have one or both of a display device and an operation input device, or the like, for example.

Also, the configuration illustrated in FIG. 4 (or a configuration according to a modification) may be realized by one, or two or more, ICs, for example.

[1-3] Server 300 (Information Processing Device)

The server 300 is a device that performs communication with the IC card 100 via the reader 200 (or directly). The server 300 is capable of performing various types of processing, such as processing performed through communication with the IC card 100, for example. Examples of processing that the server 300 performs include processing relating to examples of processing in the information processing system described later, such as processing of verifying contents of object data that is data to be recorded in a P2P database (hereinafter may be referred to simply as "object data"), processing of generating predetermined signature data in accordance with verification results, and so forth, for example. The server 300 can also perform payment processing using electronic value and so forth, for example.

Hardware Configuration Example of Server 300

Figure 5:
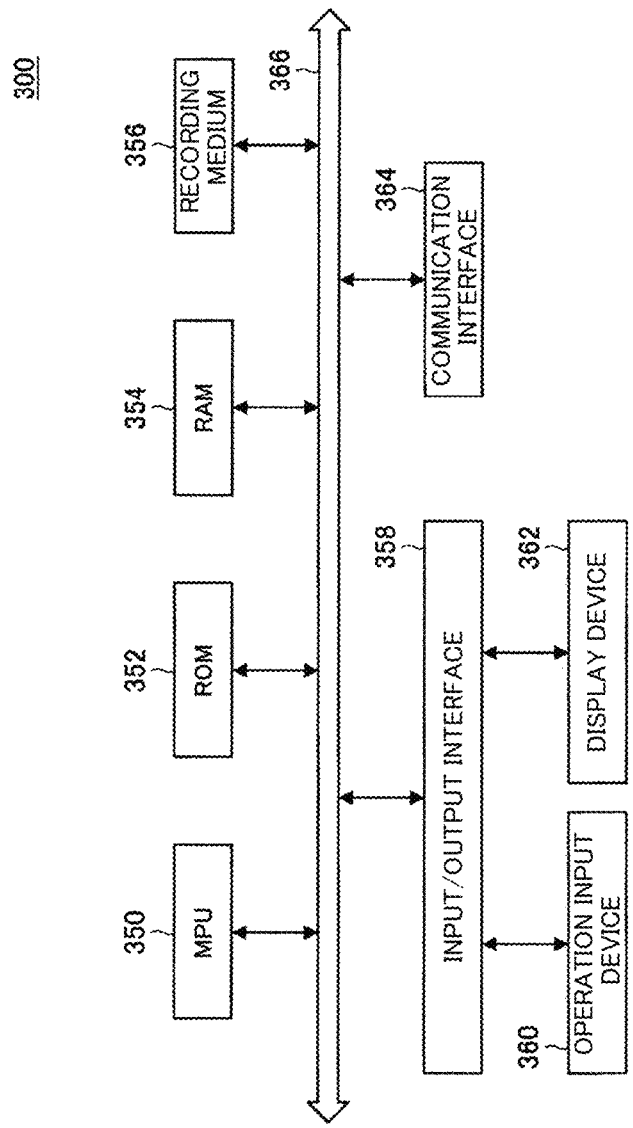
FIG. 5 is an explanatory diagram illustrating an example of a hardware Configuration of a server (information processing device) according to the present embodiment.

FIG. 5 is an explanatory diagram illustrating an example of a hardware configuration of the server 300 according to the present embodiment. The server 300 is provided with, for example, an MPU 350, ROM 352, RAM 354, a recording medium 356, an input/output interface 358, an operation input device 360, a display device 362, and a communication interface 364. Also, the components of the server 300 are connected to each other by a bus 366 serving as a data transmission path, for example. Also, the server 300 is driven by electric power supplied from an internal power source such as a battery that the server 300 is provided with, electric power supplied from an external power source to which the server 300 is connected, or the like, for example.

The MPU 350 is configured of one or two or more processors configured of a computing circuit such as an MPU or the like, various types of processing circuits, and so forth, for example, and functions as a control unit (omitted from illustration) that controls the entire server 300. The MPU 350 also serves in a leading role of performing various types of processing, such as described in examples of processing in the information processing system, which will be described later.

The ROM 352 stores control data, such as programs and computation parameters that the MPU 350 uses, and so forth. The RAM 354 temporarily stores programs executed by the MPU 350 and so forth, for example.

The recording medium 356 functions as a storage unit (omitted from illustration) that stores various types of data, such as data regarding the information processing method of the server 300 and various types of applications and so forth, for example. Examples of the recording medium 356 here include magnetic recording media such as a hard disk and so forth, and nonvolatile memory such as flash memory and the like. The recording medium 356 may also be detachably mountable to the server 300.

The input/output interface 358 connects the operation input device 360 and the display device 362, for example. The operation input device 360 functions as an operating unit (omitted from illustration), and the display device 362 functions as a display unit (omitted from illustration). Examples of the input/output interface 358 here include a USB (Universal Serial Bus) terminal, a DVI (Digital Visual Interface) terminal, an HDMI (registered trademark) (High-Definition Multimedia Interface) terminal, various types of processing circuits, and so forth.

The operation input device 360 is also provided on the server 300, for example, and connected to the input/output interface 358 within the server 300. Examples of the operation input device 360 include buttons, direction keys, rotational selectors such as jog dials, or combinations thereof, and so forth.

The display device 362 is also provided on the server 300, for example, and connected to the input/output interface 358 within the server 300. Examples of the display device 362 include a liquid crystal display, an organic EL display, and so forth.

Note that it is needless to say that the input/output interface 358 may be connected to an external device such as an external operation input device (e.g., keyboard, mouse, etc.) an external display device, or the like, of the server 300. The display device 362 may also be a device capable of display and user operations, such as a touch panel, for example.

The communication interface 364 is communication means that the server 300 is provided with, and functions as a communication unit (omitted from illustration) that performs wireless or wired communication with external devices such as the reader 200 or the like via a network (or directly). Examples of the communication interface 364 here include a communication antenna and an RF circuit (wireless communication), an IEEE 802.15.1 port and a transmission/reception circuit (wireless communication), an IEEE 802.11 port and a transmission/reception circuit (wireless communication), or a LAN terminal and a transmission/reception circuit (wired communication), and so forth. The communication interface 364 may also have an optional configuration corresponding to the network according to the present embodiment.

The server 300 performs various types of processing, such as described in examples of processing in the information processing system, which will be described later, by the hardware configuration illustrated in FIG. 5, for example. Note that the hardware configuration of the server 300 according to the present embodiment is not limited to the configuration illustrated in FIG. 5.

For example, in a case of performing communication with an external device or the like via an external communication device to which the server 300 is connected, the communication interface 364 does not have to be provided. Also, the communication interface 364 may have a configuration that is capable of performing communication with one or two or more external devices or the like by a plurality of communication systems.

Also, the server 300 may have a configuration that is not provided with part or all of the recording medium 356, the operation input device 360, and the display device 362, for example.

Also, the server 300 may assume a hardware configuration corresponding to later-described application examples of the server 300, for example.

Also, part or all of the hardware configuration illustrated in FIG. 5 (or a configuration according to a modification) may be realized by one, or two or more, ICs, for example.

[1-4] Application Examples of Devices Configuring Information Processing System According to Present Embodiment Although the reader 200 has been described above as a component of the information processing system according to the present embodiment, the present embodiment is not limited to this form. The present embodiment can be applied to optional equipment having at least functions of reading data out from an IC card, such as a "reader/writer", a "device having reader/writer functions", a "communication device performing communication by wireless communication using IEEE 802.15.1 like BLE or the like", and so forth, for example. Also, the present embodiment can be applied to a processing IC that can be assembled into equipment such as described above, for example.

Also, although the server 300 has been described above as a component of the information processing system according to the present embodiment, the present embodiment is not limited to this form. The present embodiment can be applied to various equipment, such as a "computer such as a PC (Personal Computer) or a server or the like", a "tablet-type device", a "communication device such as a smartphone", a "gaming device", and so forth, for example. Also, the present embodiment can be applied to a processing IC that can be assembled into equipment such as described above, for example.

[2] PROCESSING OF INFORMATION PROCESSING SYSTEM ACCORDING TO PRESENT EMBODIMENT

Next, an example of processing in the information processing system according to the present embodiment will be described with the information processing system 1000 illustrated in FIG. 1 as an example.

Description will be made below with regard to an example of "a case in which a P2P database is a P2P database used for transactions of virtual currency data, and object data is transaction data of the virtual currency". Note that the object data according to the present embodiment is not limited to transaction data of virtual currency. For example, the object data may optional data that can be recorded in a P2P database, such as data relating to education (e.g., data indicating academic degrees, grades, credentials, and so forth), data relating to contracts (e.g., data relating to smart contracts), and so forth.

[2-1] First Example of Processing in Information Processing System

As described above, in a case of a P2P database being used, signature data is attached to object data, and this signature data is verified, whereby the legitimacy of the transaction of virtual currency data is ensured. However, in a case of key information being leaked, signature data can be generated from a private key corresponding to the leaked key information, and accordingly ensuring the legitimacy of the transaction becomes difficult. Accordingly, there is demand for "a method enabling signature data corresponding to object data to be generated, while preventing leakage of key information", as described above.

Accordingly, in the information processing system 1000, the IC card 100 includes a recording medium that has tamper resistance, and key information is stored in the recording medium that has tamper resistance as described above. By storing the key information in the secure recording medium, the key information is stored in the IC card 100 in a safer state, and accordingly, prevention of leakage of key information can be implemented in the IC card 100.

Also, the IC card 100 generates signature data corresponding to object data on the basis of object data acquired by communication with the reader 200, and a private key corresponding to key information stored in the securer recording medium. The private key corresponding to the key information according to the present embodiment is a private key indicated by key information, or a private key generated on the basis of a seed value indicated by the key information. The IC card 100 generates signature data corresponding to the object data by executing a program relating to generation of signature data, which is stored in a recording medium (which may be a secure recording medium, but does not have to be a secure recording medium), for example. As one example, the signature data corresponding to the object data is generated by multiplying the object data by the private key, for example. Note that the method. of generating the signature data is not limited to the above-described example, and may be generated by an optional algorithm using the object data and the private key.

The IC card 100 then transmits data including the generated signature data to the reader 200, through communication with the reader 200. An example of data including signature data is data in which the signature data is attached to the object data (data in which an electronic signature is affixed to the object data). Also, data including signature data nay be the signature data itself. Communication with the reader 200 is performed through the communication unit 102 in the IC card 100. Various types of processing (processing relating to the processing method according to the present embodiment), such as processing of generating signature data on the basis of the private key corresponding to the key information, and processing of performing control to transmit data including the generated signature data, is performed by the processing unit 110 in the IC card 100.

Accordingly, the IC card 100 that performs processing according to a first example can generate signature data corresponding to the object data while preventing leakage of the key information.

Also, in a case in which the object data is transaction data of virtual currency, the transaction can be executed in the information processing system 1000 in a state of the legitimacy of the transaction of the virtual currency data being ensured, by using the IC card 100 that performs the processing according to the first example. In this case, the IC card 100 functions as an IC card type hardware wallet.

Figure 6:
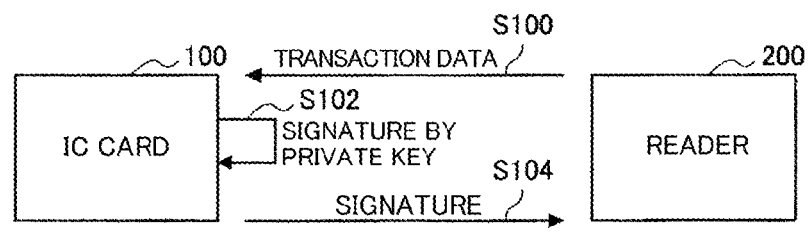
FIG. 6 is an explanatory diagram illustrating a first example of processing in the information processing system according to the present embodiment.

FIG. 6 is an explanatory diagram illustrating the first example of the processing by the information processing system 1000 according to the present embodiment. FIG. 6 illustrates processing following communication being established between the IC card 100 and the reader 200. Communication between the IC card 100 and the reader 200 is established by a method corresponding to the communication system carried out between the IC card 100 and the reader 200. This holds true of other examples of processing in the information processing system described below, as well.

The reader 200 transmits transaction data (an example of object data) (S100).

The IC card 100 that receives the transaction data transmitted from the reader 200 in step S100 generates signature data corresponding to the transaction data, on the basis of the acquired transaction data and the private key corresponding to the key information stored in the storage medium that has tamper resistance (S102). Hereinafter, the private key corresponding to the key information stored in the storage medium that has tamper resistance may be referred to simply as "private key corresponding to key information". Also, hereinafter, generating signature data on the basis of the private key corresponding to key information may be referred to as "signature by private key".

The IC card 100 then transmits data including the generated signature data to the reader 200 (S104). Hereinafter, data including signature data may be referred to as "signature".

The processing illustrated in FIG. 6, for example, is performed in the information processing system 1000 as the processing according to the first example. Note that it is needless to say that the processing according to the first example in the information processing system 1000 is not limited to the example illustrated in FIG. 6.

[2-2] Second Example of Processing in Information Processing System

A case in which the object data is transaction data of virtual currency, for example, will be assumed. Note that the example described below in which the object data is transaction data of virtual currency can be applied to cases of the object data being data regarding which a plurality of types can exist other than transaction data of virtual currency.

Various types of virtual currency exist, and the content of transaction data, the private key cryptosystem, and the signature method differ from one virtual currency to another. Also, depending on the virtual currency, the content of transaction data, the private key cryptosystem, and the signature method may change in accordance with a version update.

Now, by storing key information indicating a seed value in the recording medium that has tamper resistance provided to the IC card 100 enables private keys corresponding to each cryptosystem of the respective virtual currencies to be generated from a single seed value.

In a case in which key information indicating a seed value is stored in the recording medium that has tamper resistance, provided to the IC card 100, a program relating to generating a private key and generating signature data is stored in the recording medium with which the IC card 100 is provided, for each virtual currency, and signature data corresponding to the respective signature methods of the virtual currencies can be generated, by this program being executed. The recording medium where the programs relating to generating private keys and generating signature data is stored may have tamper resistance, but does not need to have tamper resistance.

Also, for example, in a case in which key information indicating private keys corresponding to respective virtual currencies is stored in the recording medium that has tamper resistance, provided to the IC card 100, a program relating to generating signature data is stored in the recording medium with which the IC card 100 is provided, for each virtual currency, and signature data corresponding to the respective signature methods of the virtual currencies can be generated, by this program being executed. The recording medium where the programs relating to generating signature data is stored may have tamper resistance, but does not need to have tamper resistance.

As described above, the IC card 100 stores key information in a storage medium having tamper resistance, and stores programs relating to generating signature data or programs relating to generating private keys and generating signature data in a storage medium, for example. The IC card 100 then selects a program corresponding to transaction data, and executes the selected program, thereby generating signature data corresponding to the transaction data. The IC card 100 selects the program corresponding to the transaction data on the basis of, for example, "an identifier (e.g., ID or the like indicating type of transaction), or identification data indicating an identifier (data indicating an ID or the like indicating type of transaction), acquired along with the transaction data included in transaction data". An example of processing relating to selection of a. program corresponding to transaction data will be described later.

Accordingly, the IC card 100 can generate signature data according to the type of virtual currency.

Also, the IC card 100 can handle cases in which the private key cryptosystem and the signature method changes in accordance with a version update of the virtual currency, due to a program relating to generating of signature data stored in the storage medium, or a program relating to generating of private keys and generating of signature data stored in the storage medium, being updated.

Figure 7:
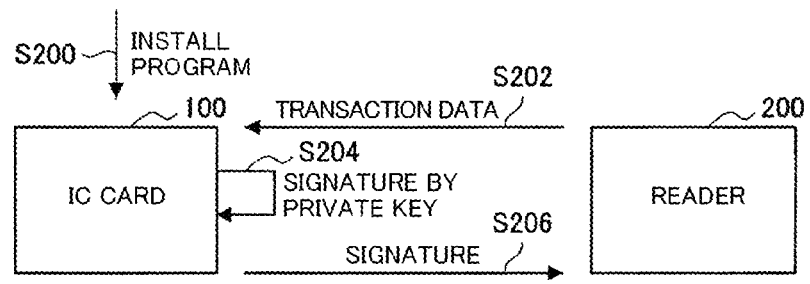
FIG. 7 is an explanatory diagram illustrating a second example of processing in the information processing system according to the present embodiment.

FIG. 7 is an explanatory diagram illustrating a second example of the processing in the information processing system 1000 according to the present embodiment. FIG. 7 illustrates processing following communication being established between the IC card 100 and the reader 200, in the same way as in FIG. 6.

A program relating to generating of signature data or a program relating to generating of private keys and generating of signature data is installed in the recording medium that the IC card 100 is provided with (S200). Installation of the program in step S200 includes a program being newly stored in the storage medium that the IC card 100 is provided with, and a program stored in the storage medium being updated.

The processing of step S200 is performed with an external device such as the server 300, via a relay device such as the reader 200 or directly, for example. Authentication may be performed between the IC card 100 and the external device, using an optional cryptosystem, such as common key cryptography or public key cryptography, and the processing of step S200 may be performed following authentication being successfully completed.

The reader 200 transmits transaction data in the same way as in step S100 in FIG. 6 (S202).

The IC card 100 that receives the transaction data transmitted from the reader 200 in step S200 generates signature data corresponding to the transaction data on the basis of the acquired transaction data and the private key corresponding to the key information stored in the storage medium that has tamper resistance (S204). The IC card 100 then transmits data including the generated signature data to the reader 200 (S206).

Figure 8:
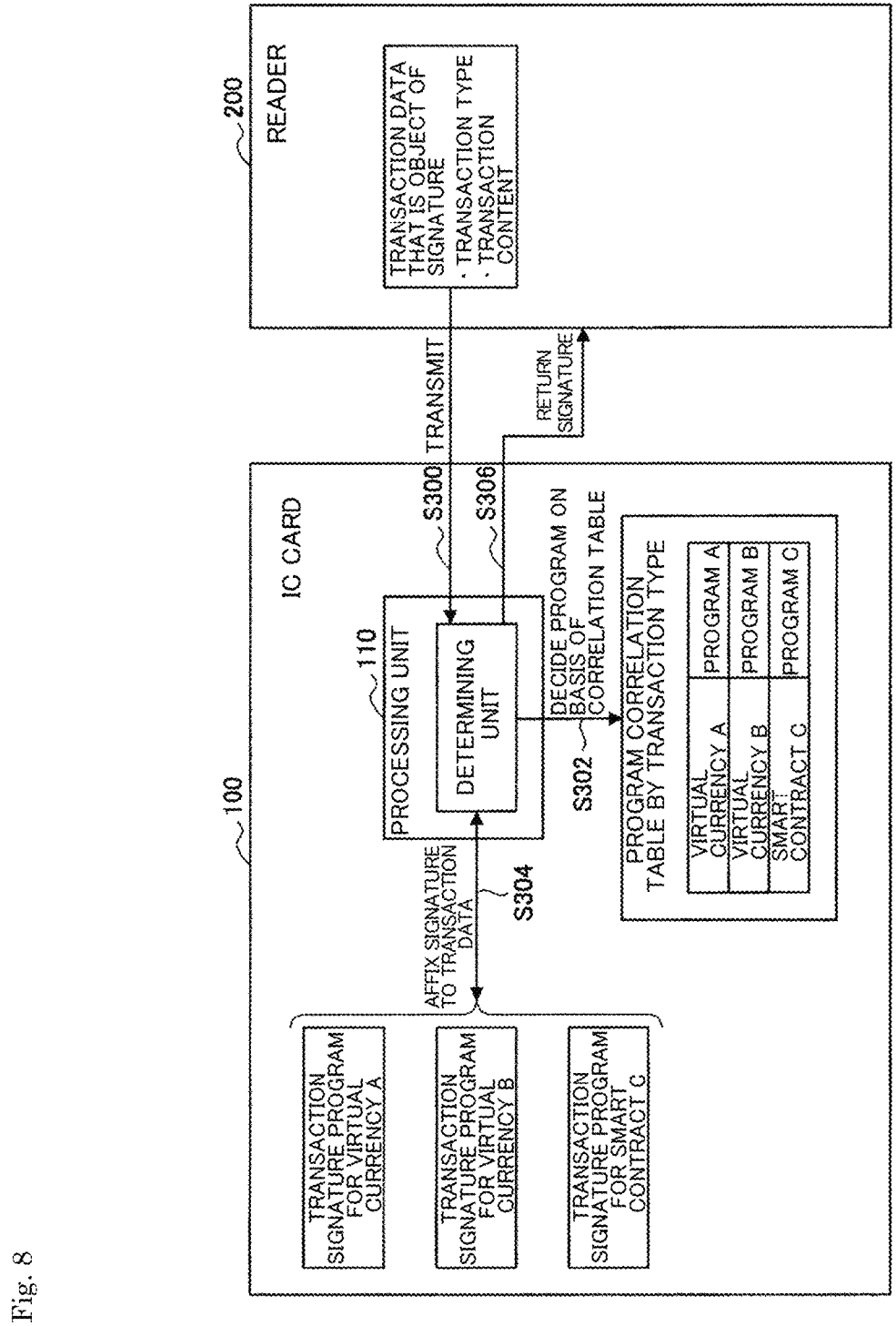
FIG. 8 is an explanatory diagram illustrating the second example of processing in the information processing system according to the present embodiment.

FIG. 8 is an explanatory diagram illustrating the second example of processing in the information processing system 1000 according to the present embodiment, and is a diagram illustrating the processing of steps S202 through S206 in FIG. 7 in greater detail. FIG. 8 illustrates "an example of the processing of step S204 and the processing of step S206 illustrated in FIG. 7 being performed by a determining unit configuring the processing unit 110 that the IC card 100 has".

The reader 200 transmits the transaction data (S300).

The IC card 100 decides a program corresponding to the transaction data on the basis of the transaction data and "a correlation table (or database) correlating transaction type and programs" stored in the recording medium (S302), for example. Upon the program corresponding to the transaction data being decided, the IC card 100 executes the program that is decided upon, thereby generating signature data corresponding to the transaction data (S304).

The IC card 100 then transmits data including the generated signature data to the reader 200 (S306).

In the information processing system 1000, the processing illustrated in FIG. 7 and FIG. 8, for example, is performed as processing relating to the second example. Note that it is needless to say that processing relating to the second example in the information processing system 1000 is not limited to the example illustrated in FIG. 7 and FIG. 8.

[2-3] Third Example of Processing in Information Processing System

A case in which the object data is transaction data of virtual currency, for example, will be assumed. Note that the example described below in which the object data is transaction data of virtual currency can be applied to cases in which the object data is data other than transaction data of virtual currency, as well.

Generally, IC cards do not have display functions. Accordingly, assuming a case of performing a virtual currency transaction using an IC card, the user of the IC card conceivably will permit the transaction upon confirming transaction contents displayed on a display screen of a display device that an external device that is the object of communication with the IC card is provided with, or transaction contents displayed on a display screen of a display device connected to this external device.

However, in a case in which falsification/tampering of transaction contents is performed at the external device that is the object of communication with the IC card, the user of the IC card cannot recognize the falsification/tampering of the transaction contents, and as a result, there is a possibility that an unauthorized money transfer will be performed.

Figure 9:
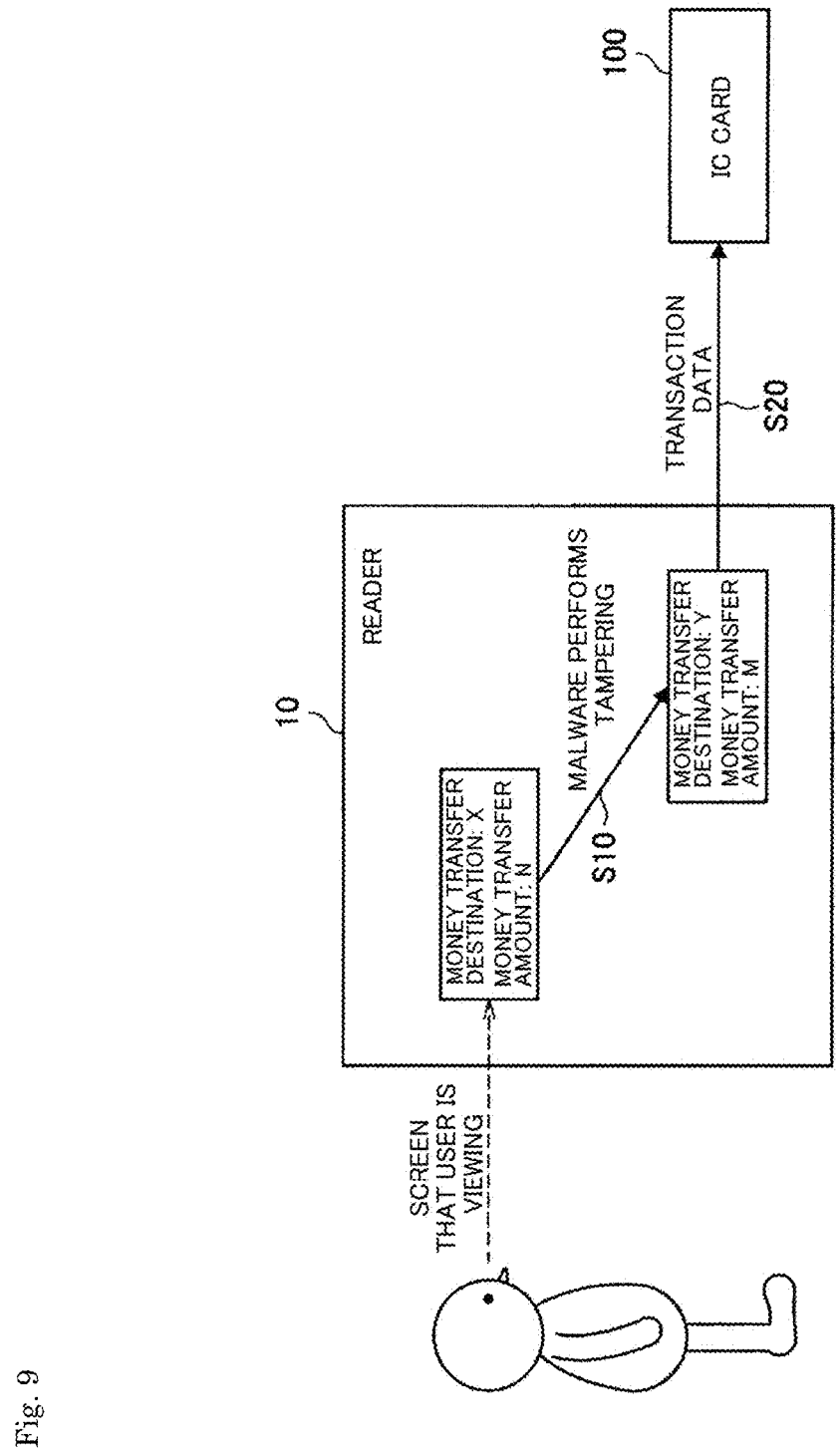
FIG. 9 is an explanatory diagram illustrating a use case in which falsification/tampering of transaction contents is performed at an external device that is the object of communication with an IC card.

FIG. 9 is an explanatory diagram illustrating a use case in which falsification/tampering of transaction contents is performed at an external device that is the object of communication with an IC card. In FIG. 9, a reader 10 is illustrated as the external device that is the object of communication with the IC card 100. Examples of the reader 10 include a terminal installed at a shop or the like, a communication device such as a smartphone, and so forth.

In the usage case illustrated in FIG. 9, the transaction contents displayed on a display screen of the reader 10 are tampered with by malware (S10), and transaction data indicating the tampered transaction contents is transmitted to the IC card 100 (S20).

For example, when signature data is generated on the basis of the transaction data transmitted in step S20 in FIG. 9, a transaction according to the transaction data indicating the tampered transaction contents is performed, and as a result, an unauthorized money transfer is performed.

Accordingly, the IC card 100 determines whether or not set signature conditions are satisfied. The IC card 100 identifies set signature conditions by referencing data indicating signature conditions stored in the recording medium that the IC card 100 is provided with, for example. The recording medium in which the data indicating signature conditions is stored may have tamper resistance, but does not need to have tamper resistance.

In a case of determining that the signature conditions are satisfied, the IC card 100 generates the signature data.

A first signature condition relating to the contents that the object data indicates can be given as an example of signature conditions according to the present embodiment. With regard to an example of a case in which the object data is transaction data for virtual currency, examples of the first signature condition include the following.

- that the monetary amount of the virtual currency indicated by the transaction contents is not more than an upper limit value (or the monetary amount of the virtual currency indicated by the transaction contents is smaller than the upper limit value)
- that the total value of the monetary amount of the virtual currency transacted within a predetermined period is not more than an upper limit value (or this total value is smaller than the upper limit value)
- that the number of transactions within a predetermined period is not more than an upper limit value (or this number of transactions is smaller than the upper limit value)
- OR, condition of above-described plurality of conditions Note that the first signature condition is not limited to the examples described above. For example, in a case in which the object data is transaction data of virtual currency, the first signature condition may be "that the monetary amount of virtual currency indicated by the transaction contents matches a monetary amount indicated by data acquired by communication with an external device trusted in advance". An example of communication with an external device trusted in advance is secure communication performed directly, without going through a relay device such as the reader 200 or the like.

In a case in which the first signature condition is "that the monetary amount of virtual currency indicated by the transaction contents matches a monetary amount indicated by data acquired by communication with an external device trusted in advance", even if falsification/tampering of transaction contents is performed, the IC card 100 does not generate signature data on the basis of the unauthorized transaction data in which falsification/tampering of transaction contents has been performed. Accordingly, in a case in which the first signature condition is "that the monetary amount of virtual currency indicated by the transaction contents matches a monetary amount indicated by data acquired by communication with an external device trusted in advance", an unauthorized money transfer can be prevented even in a case in which "the IC card 100 has no display function in the same way as with general IC cards, and falsification/tampering of transaction contents has been performed".

Regarding setting of the first signature condition, setting is performed by communication with an external device such as the server 300 that is performed via a relay device such as the reader 200 or the like, or communication performed with an external device that is directly performed with the external device, for example. The first signature condition is set in a case in which authentication is successfully performed by an optional authentication method whereby the user of the IC card 100 can be authenticated, such as a password or biometric authentication, for example. Also, resetting of the total value of the monetary amount of the virtual currency in a predetermined period according to the first signature condition or the number of transactions in a predetermined period according to the first signature condition is performed in a case in which authentication is successfully performed by an optional authentication method, for example. Note that communication between the IC card 100 and the external device regarding setting of the first signature condition and so forth may be encrypted using an optional cryptosystem, such as common key cryptography or public key cryptography.

In a case in which the signature conditions are the first signature condition such as described above, the IC card 100 determines whether the first signature condition is satisfied on the basis of transaction data, for example. In a case of determining that the first signature condition is satisfied, the IC card 100 generates signature data.

As one example, in a case in which the first signature condition is "that the monetary amount of the virtual currency indicated by the transaction contents is not more than an upper limit value", and the monetary amount of the virtual currency indicated by the transaction data is not more than the upper limit value, the IC card 100 determines that the first signature condition is satisfied. For example, in a case in which the upper limit value is "1000", the IC card 100 determines that the first signature condition is satisfied when the monetary amount of the virtual currency indicated by the transaction data is not more than "1000". The IC card 100 then generates signature data corresponding to the transaction data.

In a case in which the first signature condition is "that the monetary amount of the virtual currency indicated by the transaction contents is not more than an upper limit value", even if falsification/tampering of the transaction contents is performed, damages that the user of the IC card 100 incurs can be limited to within the upper limit value.

As another example, in a case in which the first signature condition is "that the total value of the monetary amount of the virtual currency transacted within a predetermined period is not more than an upper limit value" or "that the number of transactions within a predetermined period is not more than an upper limit value", the IC card 100 determines whether the first signature condition is satisfied on the basis of the transaction data and history information stored in the recording medium that the IC card 100 is provided with.

The history information according to the present embodiment is data indicating history of generating signature data. The history information has data indicating the time at which signature data was generated (e.g., data indicating the clock time of generating) and data indicating contents that the object data corresponding to the signature data indicates (e.g., data indicating transaction contents) are recorded in a correlated manner. Also, data indicating clients (e.g., addresses or the like) may be further recorded in the history information in a correlated manner. When signature data is generated, the IC card 100 records history information corresponding to the generated signature data in the recording medium that the IC card 100 is provided with (the recording medium configuring the storage unit 104).

For example, in a case in which the first signature condition is "that the total value of the monetary amount of the virtual currency transacted within a predetermined period is not more than an upper limit value", the IC card 100 identifies data indicating time, in which the clock time at which signature data was generated is included in the predetermined period, from the history information stored in the recording medium. The IC card 100 identifies the predetermined period with a point in time of processing or a point in time of transaction data acquisition as a reference, for example. Next, the IC card 100 identifies, from the history information, data indicating transaction contents correlated with data indicating the identified time, and calculates "the total value of the monetary amount of virtual currency transacted during the predetermined period", on the basis of the transaction contents indicated by data indicating the identified transaction contents, and the monetary amount of virtual currency that the transaction data indicates. When the calculated total value is not more than the upper limit value, the IC card 100 determines that the first signature condition is satisfied, and generates signature data corresponding to the transaction data. For example, in a case in which the upper limit value is "100,000", the IC card 100 determines that the first signature condition is satisfied when the calculated total value is not more than "100,000". The IC card 100 then generates signature data corresponding to the transaction data.

In a case in which the first signature condition is "that the total value of the monetary amount of the virtual currency transacted within a predetermined period is not more than an upper limit value", even if falsification/tampering of the transaction contents is performed, damages that the user of the IC card 100 incurs can be limited to within the upper limit value.

Also, in a case in which the first signature condition is "that the number of transactions within a predetermined period is not more than an upper limit value", for example, the IC card 100 identifies data indicating time, in which the clock time at which signature data was generated is included in the predetermined period, from history information stored in the recording medium. Next, the IC card 100 calculates the number of transactions by adding "1", which is the number times of generating signature data associated with the acquired transaction data, to a data count of data indicating the identified time. When the calculated number of transactions is not more than the upper limit value, the IC card 100 determines that the first signature condition is satisfied, and generates signature data corresponding to the transaction data. For example, in a case in which the upper limit value is "10", the IC card 100 determines that the first signature condition is satisfied when the calculated number of transactions is not more than "10". The IC card 100 then generates signature data corresponding to the transaction data.

In a case in which the first signature condition is "that the number of transactions within a predetermined period is not more than an upper limit value", even if the IC card 100 is unauthorizedly used by a third party other than the user, the number of times of unauthorized use can be limited.

The IC card 100 determines whether the first signature condition is satisfied on the basis of the object data, or on the basis of the object data and history information, and in a case of determining that the first signature condition is satisfied, generates signature data, as in the above-described examples. Note that it is needless to say that examples of generating signature data on the basis of the first signature condition is not limited to the above examples.

Note that processing performed in a case in which signature conditions include the first signature condition is not limited to the above examples.

For example, in a case in which determination is not made that the first signature condition is satisfied, the IC card 100 transmits data indicating an error in generating signature data to the external device that transmitted the transaction data. Hereinafter, data indicating an error in generating signature data may be referred to simply as "error". At this time, the IC card 100 does not have to generate signature data corresponding to the transaction data.

Also, in a case in which a second signature condition relating to predetermined authentication is further included in the signature conditions, for example, and determination is not made that the first signature condition is satisfied, the IC card 100 determines whether the second signature condition is satisfied, on the basis of data acquired from an external device such as the reader 200 or the like.

Examples of the second signature condition include signature conditions relating to predetermined verification of signature data, such as "that verification of signature data corresponding to a predetermined external device is successfully completed" or the like. For example the IC card 100 determines that, the second signature condition is satisfied when signature data included in acquired data is verified using a public key stored in a recording medium having tamper resistance that the IC card 100 is provided with. The device corresponding to the public keys stored in the recording medium having tamper resistance, i.e., the device that has generated the signature data by a private key forming a pair with the public key corresponds to the predetermined external device relating to the second signature condition.

Note that the second signature condition is not limited to the example described above. For example, the second signature condition may be "that authentication by an optional authentication method capable of authentication of the user of the IC card 100, such as password or biometric authentication, is successfully completed".

In a case of determining that the second signature condition is satisfied, the IC card 100 generates signature data. In this case, signature data is generated even though determination is not made that the first signature condition is satisfied. That is to say, generation of signature data based on the second signature condition being satisfied is an exception in generating signature data by the IC card 100, in which signature data is generated without satisfying the first signature condition.

Also, when determination is not made that the second signature condition is satisfied, the IC card 100 transmits an authentication request, requesting predetermined authentication, to an external device such as the reader 200 or the like.

The authentication request according to the present embodiment differs depending on the second signature condition, for example. As one example, in a case in which the second signature condition is that "verification of signature data corresponding to a predetermined external device is successfully completed", an authentication request includes a transmission command. for signature data corresponding to the predetermined external device, and data indicating the predetermined external device (e.g., data indicating an IP address, a public key, etc.). As another example, in a case in which the second. signature condition is "that authentication by an optional authentication method capable of authentication of the user of the IC card 100 is successfully completed", an authentication request includes an authentication command and data indicating the authentication contents.

In a case in which data is acquired from an external device such as the reader 200 or the like during a predetermined period following transmission of the authentication request, the IC card. 100 determines whether the second signature condition is satisfied again on the basis of the acquired data, for example. This predetermined period may be a fixed period that is set, or may be the period of the session with the external device.

In a case in which determination is made that the second signature condition is satisfied by performing determination again, the IC card 100 generates signature data. Also, in a case in which determination is not made that the second signature condition is satisfied. by performing determination again, the IC card 100 transmits data indicating an error in generating signature data to the external device that transmitted the data. Note that in a case in which determination is not made that the second signature condition is satisfied by performing determination again, the IC card 100 may retransmit an authentication request.

Note that processing of the IC card 100 following transmission of the authentication request is not limited to the example described above.

For example, the IC card 100 may perform determination regarding the first signature condition and determination regarding the second signature condition again. In a case of performing determination regarding the first signature condition and determination regarding the second signature condition again, the IC card 100 performs processing in the same way as a case of performing the first time. When performing determination regarding the first signature condition and determination regarding the second signature condition again, in a case of performing processing in the same way as the first time, signature data is generated when determination is made that the first signature condition is satisfied or determination is made that the second signature condition is satisfied, as described above. Note that an arrangement may be made where, in a case of performing determination regarding the first signature condition and determination regarding the second signature condition again, signature data is generated by the IC card 100 only in a case of both the first signature condition and the second signature condition being satisfied.

Figure 10:
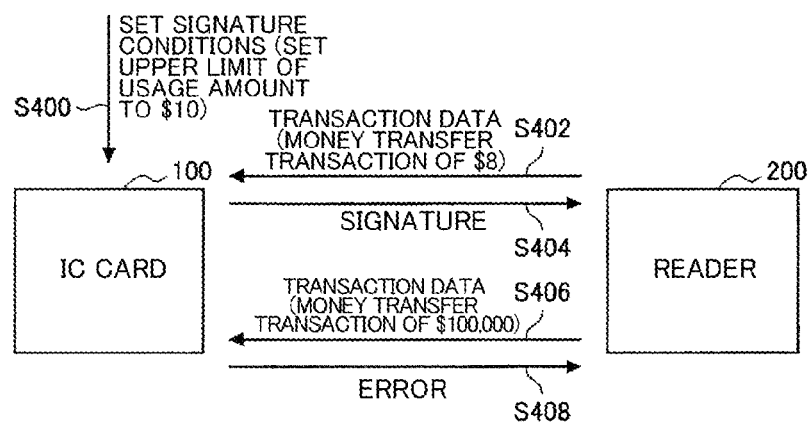
FIG. 10 is an explanatory diagram illustrating a third example of processing in the information processing system according to the present embodiment.

FIG. 10 is an explanatory diagram illustrating a third. example of processing in the information processing system 1000 according to the present embodiment. FIG. 10 illustrates processing following communication being established between the IC card 100 and the reader 200, in the same way as in FIG. 6.

Signature conditions are set in the storage medium that the IC card 100 is provided with (S400). In FIG. 10, an example is illustrated in which "monetary amount of virtual currency indicated by transaction contents is not more than $10" is set as the first signature condition.

The reader 200 transmits transaction data in the same way as in step S100 in FIG. 6 (S402). An example is illustrated in which the transaction contents that the transaction data indicates satisfy the first signature condition in step S402. Accordingly, the IC card 100 that receives the transaction data transmitted from the reader 200 in step S402 generates signature data corresponding to the transaction data, and transmits data including the generated signature data to the reader 200 (S404).

The reader 200 transmits the transaction data in the same way as in step S100 in FIG. 6 (S406). An example is illustrated in which the transaction contents that the transaction data indicates do not satisfy the first signature condition in step S406. Accordingly, the IC card 100 that receives the transaction data transmitted from the reader 200 in step S406 transmits data indicating an error in generating signature data to the reader 200 (S408).

Figure 11:
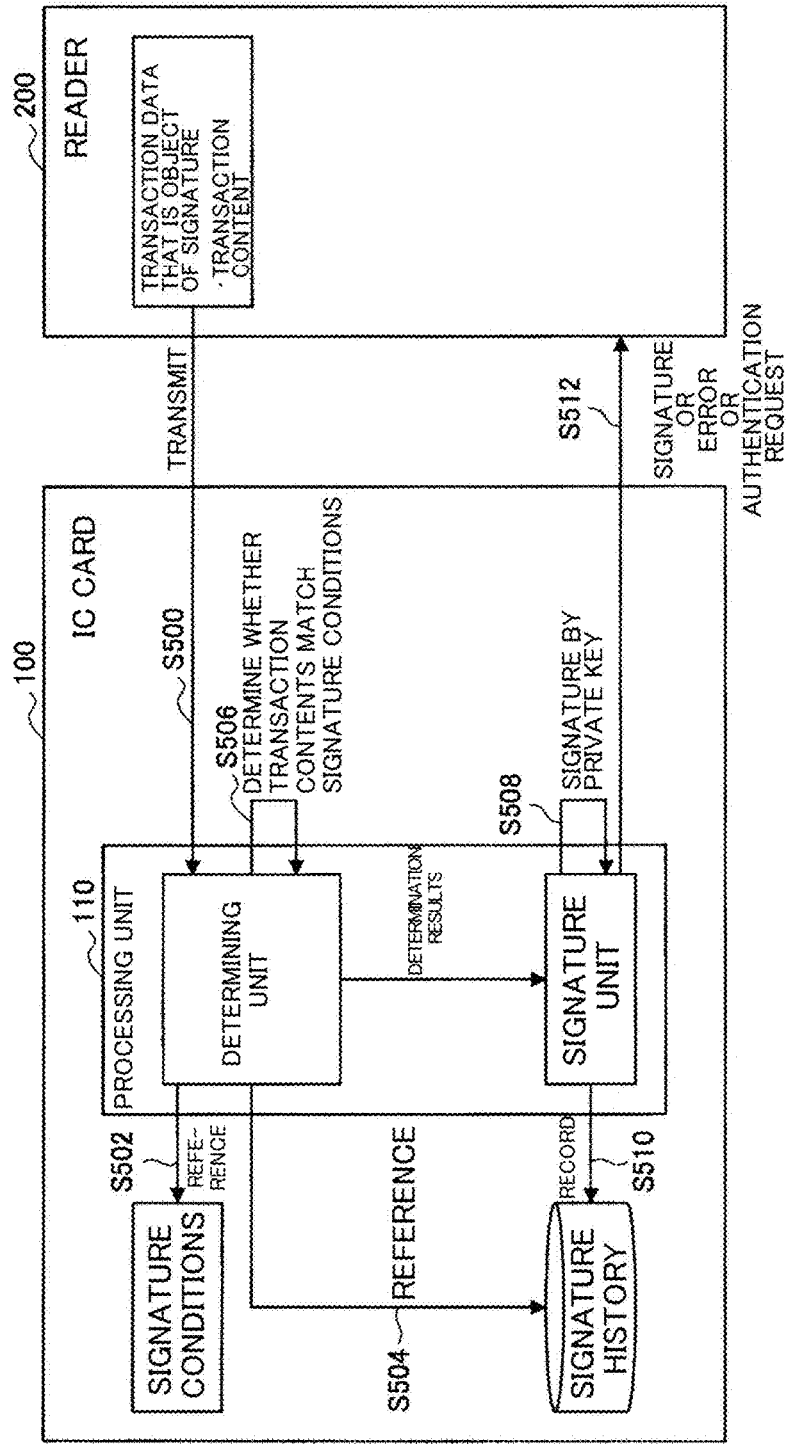
FIG. 11 is an explanatory diagram illustrating the third example of processing in the information processing system according to the present embodiment.

FIG. 11 is an explanatory diagram illustrating a third example of processing in the information processing system 1000 according to the present embodiment. FIG. 11 is a diagram illustrating processing at the IC card 100 in more detail as compared to FIG. 10. FIG. 11 illustrates "an example in which a determining unit and a signature unit configuring the processing unit 110 that the IC card 100 has perform processing at the IC card 100". In FIG. 11, history information is shown as "signature history".

The reader 200 transmits transaction data (S500).

The IC card 100 references the signature conditions and history information stored in the recording medium (S502, S504) and determines whether the transaction contents indicated by the transaction data satisfy the first signature condition (S506).

In a case in which determination is made in step S506 that the first signature condition is satisfied, the IC card 100 generates signature data corresponding to the transaction data on the basis of the acquired transaction data and a private key corresponding to the key information stored in the storage medium that has tamper resistance (S508). The IC card 100 also records history information corresponding to the generated signature data in the storage medium configuring the storage unit 104 (S510). The IC card 100 then transmits data including the generated signature data to the reader 200 (S512).

Also, in a case in which determination is not made in step S506 that the first signature condition is satisfied, the IC card 100 transmits data indicating an error in generating signature data to the reader 200 (S512).

Note that in a case of not determining that the first signature condition is satisfied in step S506, the IC card 100 may transmit an authentication request to the reader 200 (S512).

Figure 12:
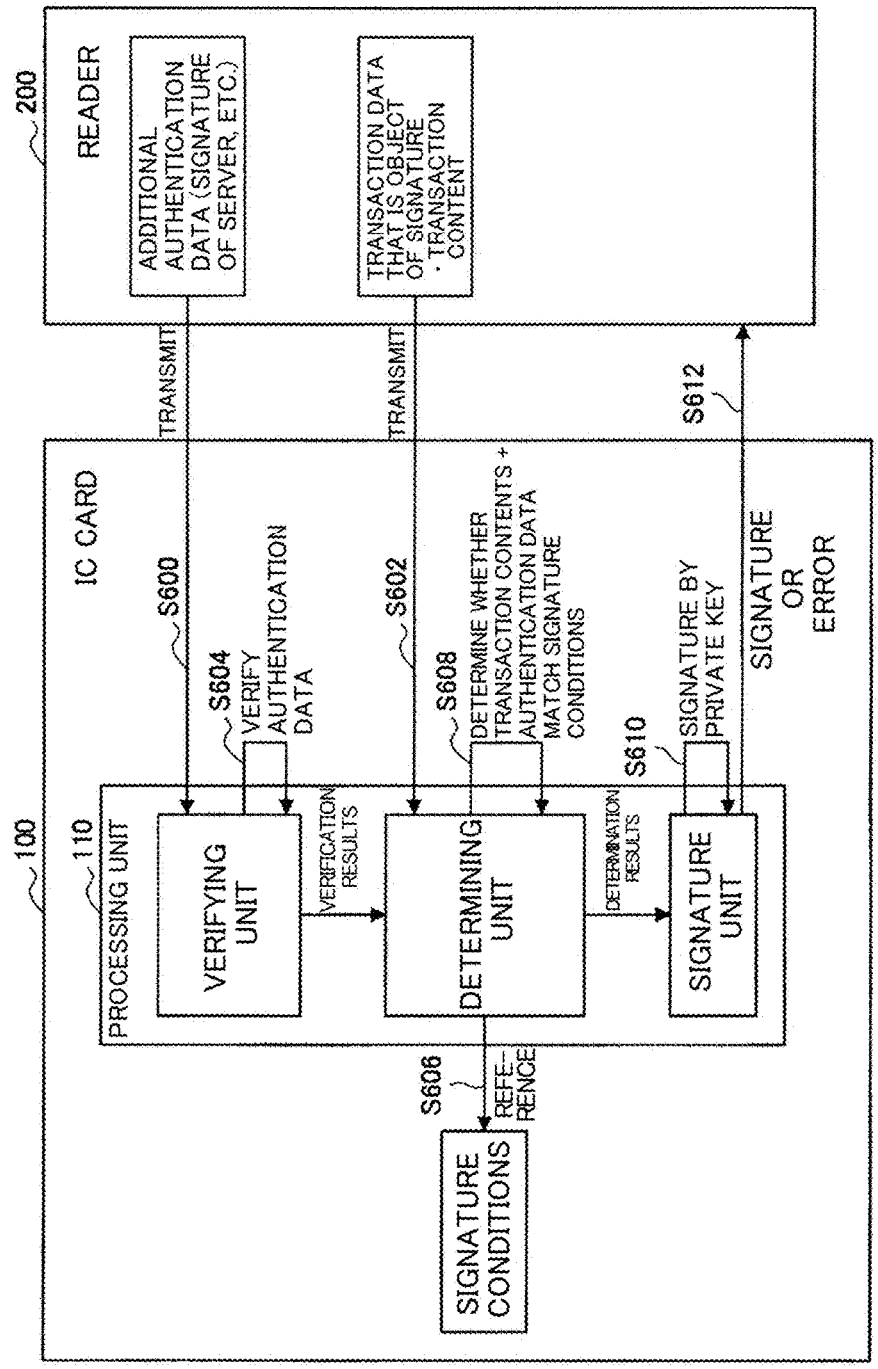
FIG. 12 is an explanatory diagram illustrating the third example of processing in the information processing system according to the present embodiment.

FIG. 12 is an explanatory diagram illustrating the third example of processing in the information processing system 1000 according to the present embodiment. FIG. 12 illustrates an example of processing in a case in which an authentication request has been transmitted in step S512 in FIG. 11. FIG. 12 illustrates "an example in which a verifying unit, a determining unit, and a signature unit configuring the processing unit 110 that the IC card 100 has, perform processing at the IC card 100".

The reader 200 transmits authentication data and transaction data (S600, S602).

In step S600, the IC card 100 that receives the authentication data transmitted from the reader 200 verifies the received authentication data (S604). For example, in a case in which the authentication data is signature data, the IC card 100 verifies the signature data using a public key stored in the storage medium that the IC card 100 is provided with.

The IC card 100 that receives the transaction data transmitted from the reader 200 in step S602 references the signature conditions and determines whether the transaction contents that the transaction data indicates satisfy the first signature condition in the same way as in steps S502 through S506 in FIG. 11 for example, and determines whether the second signature condition is satisfied on the basis of the verification results of step S604 (S606, S608).

The IC card 100 generates signature data corresponding to the transaction data on the basis of the acquired transaction data and a private key corresponding to the key information stored in the storage medium having tamper resistance, on the basis of the determination results in step S608 (S610). In a case of determining that the first signature condition is satisfied, or determining that the second signature condition is satisfied, for example, the IC card 100 generates signature data corresponding to the transaction data. Also, an arrangement may be made in which the IC card 100 generates signature data only in a case in which both of the first signature condition and the second signature condition are satisfied, for example.

Although not illustrated in FIG. 12, the IC card 100 may store history information corresponding to the generated signature data in the storage medium configuring the storage unit 104, in the same way as in step S510 in FIG. 11.

In a case in which signature data corresponding to the transaction data is generated in step S610, i.e., in a case in which determination is made that the signature conditions are satisfied, the IC card 100 transmits data including the generated signature data to the reader 200 (S612). Also, in a case in which signature data corresponding to the transaction data is not generated in step S610, i.e., in a case in which determination is not made that the signature conditions are satisfied, the IC card 100 transmits data indicating an error in generating signature data to the reader 200 (S612).

In the information processing system 1000, processing illustrated in FIG. 10 through FIG. 12, for example, is performed as processing relating to the third example. Note that it is needless to say that processing relating to the third example in the information processing system 1000 is not limited to the example illustrated in FIG. 10 through FIG. 12.

[2-4] Fourth Example of Processing in Information Processing System

Note that "processing capable of reducing the effects in a case in which falsification/tampering of the contents of object data is performed, as in the usage case of an unauthorized money transfer described with reference to FIG. 9" is not limited to the processing relating to the third example in the information processing system 1000. Processing relating to a fourth example will be described below by way of an example of a case in which the object data is transaction data of virtual currency, in the same way as processing relating to the third example of the information processing system.

For example, the effects in a case in which falsification/tampering of the contents of object data is performed can be reduced "in a case in which transaction contents that the transaction data indicates are verified by a device trusted in advance (external device of IC card 100), and guaranteed that there is no falsification/tampering of the contents of transaction data", even without the IC card 100 determining whether the first signature condition is satisfied regarding the contents that the object data indicates.

Accordingly, the IC card 100 determines whether the second signature condition (example of signature conditions that are set) regarding predetermined authentication is satisfied.

In a case in which determination is made that the second signature condition is satisfied, the IC card 100 then generates signature data. "That verification of signature data corresponding to a predetermined external device is successfully completed" can be given as a second signature condition relating to processing relating to the fourth example.

The IC card 100 determines that the second signature condition is satisfied when the signature data included in the acquired data is successfully verified using a public key stored in the storage medium having tamper resistance that the IC card 100 is provided with, for example. A device corresponding to the public key stored in the storage medium having tamper resistance, i.e., the device that generated the signature data by a private key making up a pair with the public key corresponds to the predetermined external device relating to the second signature condition. Also, the predetermined external device relating to the second signature condition corresponds to the device trusted in advance.

Also, in a case in which determination is not made that the second signature condition is satisfied, the IC card 100 transmits data indicating an error in generating signature data to an external device such as the reader 200 or the like, in the same way as the processing relating to the third example above, for example. Note that in a case in which determination is not made that the second signature condition is satisfied, the IC card 100 may transmit an authentication request to the external device, in the same way as in the processing relating to the third example above, for example.

Note that processing relating to the fourth example regarding the IC card 100 is not limited to the example described above. For example, the IC card 100 may generate signature data in a case in which both of the first signature condition and the second signature condition are satisfied, in the same way as in the example of processing relating to the third example described above.

An example of the processing relating to the fourth example in the information processing system 1000 will be described below, by way of an example in which the predetermined external device relating to the second signature condition, i.e., the device trusted in advance, is the server 300.

Figure 13:
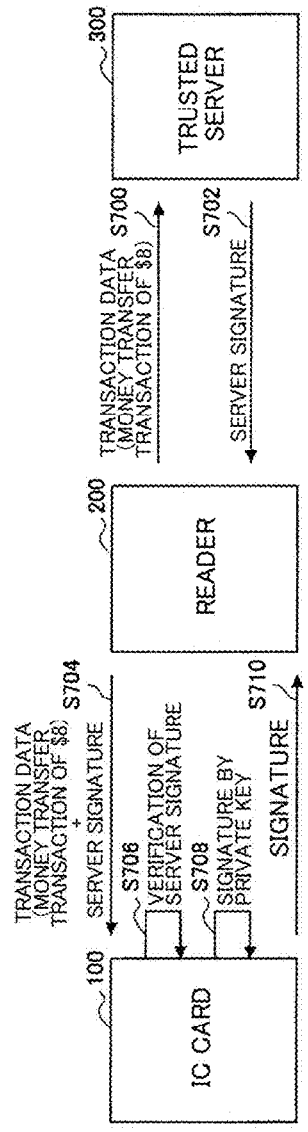
FIG. 13 is an explanatory diagram illustrating a fourth example of processing in the information processing system according to the present embodiment.

FIG. 13 is an explanatory diagram illustrating the fourth example of processing in the information processing system 1000 according to the present embodiment. In FIG. 13, the server 300 is illustrated as "trusted server" for sake of convenience, to show that the server 300 is a device trusted in advance.

The reader 200 transmits transaction data to the server 300 (S700).

The server 300 that receives the transaction data transmitted from the reader 200 in step S700 verifies the transaction data, and in a case in which verification is successful, generates signature data corresponding to the server 300, and transmits the generated signature data to the reader 200 (S702). The server 300 verifies the transaction data by determining whether signature conditions are satisfied or not, in the same way as with the processing at the IC card 100 in the third example, for example. Also, the server 300 generates signature data corresponding to the transaction data on the basis of the transaction data and a private key corresponding to the server 300, for example. Hereinafter, signature data corresponding to the transaction data, generated at the server 300, may be referred to as "signature data corresponding to server 300" or "server signature".

Note that the server 300 may further authenticate the device that has transmitted the transaction data, on the basis of one or both of an ID of the reader 200 that has transmitted the transaction data and an ID indicating a location where the reader 200 is installed (e.g., shop ID or the like). The server 300 compares a whitelist or a blacklist, for example, with the ID or the like of the reader 200 that has transmitted the transaction data, thereby authenticating the device that has transmitted the transaction data. In a case of authenticating the device that has transmitted the transaction data, the server 300 may generate signature data corresponding to the server 300 in a case in which authentication of the device that has transmitted the transaction data is successfully completed.

The reader 200 that receives signature data corresponding to the server 300, transmitted from the server 300 in step S702, transmits the transaction data and the signature data corresponding to the server 300 to the IC card 100 (S704).

Note that the reader 200 may further authenticate the device that has transmitted the transaction data on the basis of the ID or the like of the server 300 that has transmitted the signature data. The reader 200 compares a whitelist or a blacklist, for example, with the ID or the like of the server 300, thereby authenticating the device that has transmitted the signature data. In a case of authenticating the device that has transmitted the signature data, the reader 200 transmits the transaction data and the signature data corresponding to the server 300 to the IC card 100 in a case in which authentication of the device that has transmitted the signature data is successfully completed.

The IC card 100 that receives the data transmitted from the reader 200 in step S704 verifies signature data corresponding to the server 300 that is included in the received data (S706). For example, the IC card 100 verifies the signature data using a public key stored in the storage medium that the IC card 100 is provided with.

The IC card 100 generates signature data corresponding to the transaction data on the basis of, for example, transaction data acquired "in a case in which the signature data corresponding to the server 300 is verified in step S706, and the contents of transaction data obtained as a results of the verification and contents of the transaction data included in the received data match", and a private key corresponding to the key information stored in the storage medium having tamper resistance (S708). The IC card 100 then transmits data including the generated signature data to the reader 200 (S710).

Also, the IC card 100 may transmit data indicating an error in generating signature data to the reader 200 "in a case in which signature data corresponding to the server 300 is not verified in step S706" or "in a case in which contents of transaction data acquired as the result of verification and contents of transaction data included in received data do not match", for example.

Figure 14:
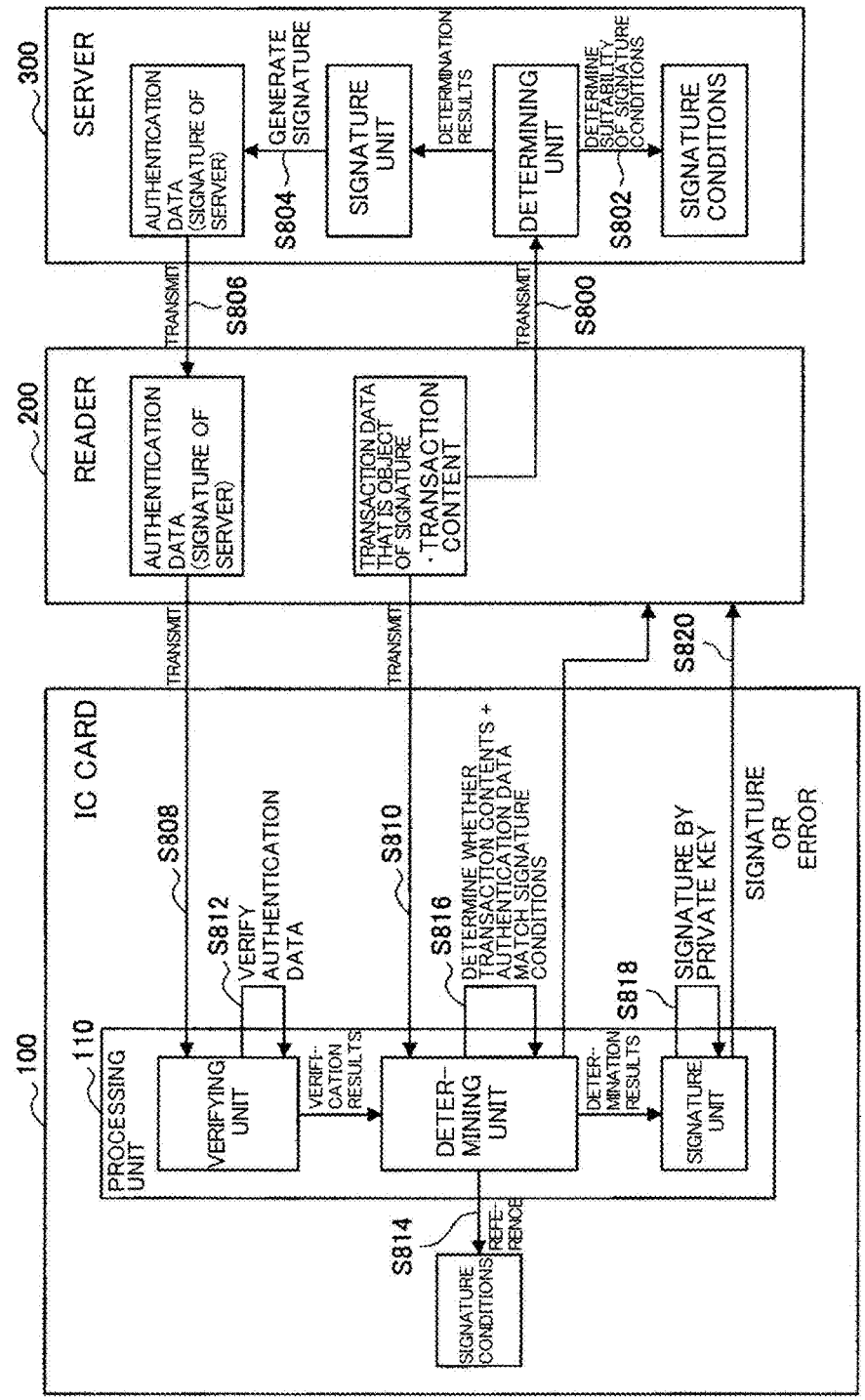
FIG. 14 is an explanatory diagram illustrating the fourth example of processing in the information processing system according to the present embodiment.

FIG. 14 is an explanatory diagram illustrating the fourth example of processing in the information processing system 1000 according to the present embodiment. FIG. 14 is a diagram illustrating the processing in the information processing system 1000 illustrated in FIG. 13, in more detail than in FIG. 13. FIG. 14 illustrates "an example in which processing at the server 300 is performed by a determining unit and a signature unit configuring a control unit that the server 300 has". FIG. 14 also illustrates "an example of processing at the IC card 100 performed by a verifying unit, a determining unit, and a signature unit configuring the processing unit 110 that the IC card 100 has". FIG. 14 also illustrates an example in which the IC card 100 generates signature data in a case in which both of the first signature condition and the second signature condition are satisfied.

The reader 200 transmits transaction data to the server 300 (S800).

The server 300 that receives the transaction data transmitted from the reader 200 in step S800 determines whether or not signature conditions are satisfied, in the same way as with the processing at the IC card 100 in the third example, for example (S802). The signature conditions of the server 300 may also include "that authentication of the device that transmitted the transaction data was successful". In a case in which "that authentication of the device that transmitted the transaction data was successful" is included in the signature conditions, the server 300 authenticates the reader 200 (an example of the device that transmitted the transaction data) on the basis of the ID of the reader 200 transmitted from the ID of the reader 200, or the like, for example.

The server 300 selectively generates signature data corresponding to the server 300, on the basis of determination results in step S802 (S804). In a case of determining that signature conditions are satisfied in step S802, the server 300 generates signature data corresponding to the server 300, on the basis of transaction data and a private key corresponding to the server 300. Hereinafter, signature data corresponding to the server 300 may be referred to as "authentication data".

When signature data corresponding to the server 300 is generated in step S804, the server 300 transmits the signature data corresponding to the server 300 to the reader 200 (S806).

The reader 200 that receives signature data corresponding to the server 300, transmitted from the server 300 in step S806 transmits the signature data corresponding to the server 300 and the transaction data to the IC card 100 (S808, S810).

The IC card 100 that receives the signature data corresponding to the server 300 that is transmitted from the reader 200 in step S808 verifies signature data corresponding to the server 300 that has been received (S812). The IC card 100 verifies the signature data using a public key stored in the storage medium that the IC card 100 is provided with, for example.

The IC card 100 that receives the transaction data transmitted from the reader 200 in step S810 references the signature conditions and determines whether the transaction contents that the transaction data indicates satisfies the first signature condition, and determines whether the second signature condition is satisfied on the basis of the verification results in step S812, in the same way as in steps S606 and S608 in FIG. 12, for example (S814, S816).

The IC card 100 generates signature data corresponding to the transaction data on the basis of the acquired transaction data and a private key corresponding to the key information stored in the storage medium having tamper resistance, on the basis of the determination results in step S816 (S818). In a case in which both of the first signature condition and the second signature condition are satisfied, for example, the IC card 100 generates signature data. Note that an arrangement may be made in which the IC card 100 generates signature data corresponding to the transaction data in a case in which determination is made that the second signature condition is satisfied, for example.

Although not illustrated in FIG. 14, the IC card 100 may store history information corresponding to the generated signature data in the storage medium configuring the storage unit 104, in the same way as in step S510 in FIG. 11.

In a case in which signature data corresponding to the transaction data is generated in step S818, i.e., in a case in which determination is made that the signature conditions are satisfied, the IC card 100 transmits data including the generated signature data to the reader 200 (S820). Also, in a case in which signature data corresponding to the transaction data is not generated in step S818, i.e., in a case in which determination is not made that the signature conditions are satisfied, the IC card 100 transmits data indicating an error in generating signature data to the reader 200 (S820).

Note that processing relating to the fourth example in the information processing system 1000 is not limited to the example illustrated in FIG. 13 and FIG. 14.

For example, the server 300 may transmit an authentication request to an external device, and selectively generate signature data corresponding to the server 300 on the basis of the authentication results as to the authentication request, in the same way as with processing at the IC card 100 in the third example described above.

The server 300 transmits authentication requests to, for example, a device correlated with the ID of the IC card 100, an email address correlated with the ID of the IC card 100, an SNS (Social Networking Service) account correlated with the ID of the IC card 100, an application correlated with the ID of the IC card 100, and so forth. An example of a device that is correlated with the ID of the IC card 100 is a device that the user possesses, such as a smartphone or the like that the user of the IC card 100 possesses (hereinafter referred to as "user terminal"). The server 300 acquires the ID of the IC card 100 by performing communication with the IC card 100 via a relay device such as the reader 200 or the like, or directly performing communication with the IC card 100, for example.

Examples of authentication with regard to an authentication request include authentication by a user pressing a confirmation button in an application running on the user terminal, and authentication by an optional authentication method whereby the user of the IC card 100 can be authenticated, such as a password or biometric authentication. Also, authentication with regard to an authentication request is not limited to authentication of the user of the IC card 100. Authentication with regard to an authentication request may be authentication of a person correlated with the user, such as a protector or guardian of the user of the IC card 100, for example. Examples of authentication of a person correlated with the user include authentication by a password or biometric authentication or the like, verification of signature data by a device with which the person correlated with the user is correlated, and so forth.

Figure 15:
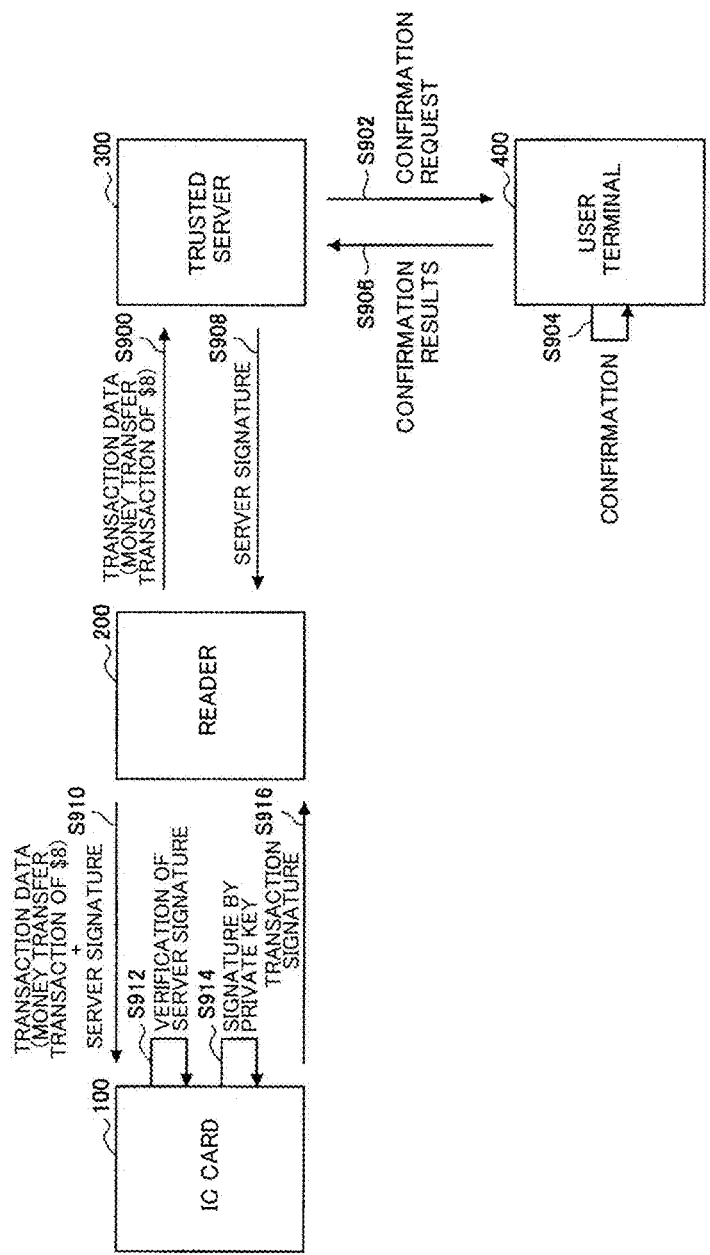
FIG. 15 is an explanatory diagram illustrating the fourth example of processing in the information processing system according to the present embodiment.

FIG. 15 is an explanatory diagram illustrating the fourth example of processing in the information processing system 1000 according to the present embodiment. In FIG. 15, the server 300 is illustrated as "trusted server" for sake of convenience, to show that the server 300 is a device trusted in advance, in the same way as in FIG. 13. Also, FIG. 15 illustrates an example in which the device that is the object of transmission of an authentication request is "user terminal 400".

The reader 200 transmits transaction data to the server 300 (S900).

The server 300 that receives the transaction data transmitted from the reader 200 in step S900 verifies the transaction data in the same way as in step S702 in FIG. 13, and transmits an authentication request to the user terminal 400 on the basis of the verification results (S902).

The user terminal 400 that receives the authentication request transmitted from the server 300 in step S902 performs authentication by a method corresponding to the authentication request (S904), The user terminal 400 then transmits the authentication results of step S904 to the server 300 (S906).

The server 300 that receives the authentication results transmitted from the user terminal 400 in step S906 generates signature data corresponding to the server 300 in a case in which the authentication results indicate that authentication is successful, and transmits the generated signature data to the reader 200 (S908). Note that the server 300 may further perform authentication of the device that has transmitted the transaction data on the basis of the ID of the reader 200 that has transmitted the transaction data or the like, in the same way as in the example in FIG. 13.

The reader 200 that receives the signature data corresponding to the server 300, transmitted from the server 300 in step S908 transmits the transaction data and the signature data corresponding to the server 300 to the IC card 100 (S910). Note that the reader 200 may further authenticate the device that has transmitted the signature data on the basis of the ID of the server 300 that has transmitted the signature data or the like, in the same way as in the example in FIG. 13.

The IC card 100 that receives the data transmitted from the reader 200 in step S910 verifies the signature data corresponding to the server 300 that is included in the received data, in the same way as in step S706 in FIG. 13, for example (S912).

The IC card 100 generates signature data corresponding to the transaction data on the basis of transaction data acquired "in a case in which the signature data corresponding to the server 300 is verified in step S912, and the contents of transaction data obtained as a results of the verification and contents of the transaction data included in the received data match", and a private key corresponding to the key information stored in the storage medium having tamper resistance (S914). The IC card 100 then transmits data including the generated signature data to the reader 200 (S916).

Also, the IC card 100 may transmit data indicating an error in generating signature data to the reader 200 "in a case in which signature data corresponding to the server 300 is not verified in step S912" or "in a case in which contents of transaction data acquired as the result of verification and contents of transaction data included in received data do not match", for example.

The processing illustrated in FIG. 13 through FIG. 15, for example, is performed in the information processing system 1000 as the processing according to the fourth example. Note that it is needless to say that the processing according to the fourth example in the information processing system 1000 is not limited to the example illustrated in FIG. 13 through FIG. 15.

[2-5] Fifth Example of Processing in Information Processing System

Note that "processing capable of reducing the effects in a case in which falsification tampering of the contents of object data is performed, as in the usage case of an unauthorized money transfer described with reference to FIG. 9" is not limited to the processing relating to the third example in the information processing system 1000 and the processing relating to the fourth example in the information processing system 1000.

For example, the IC card 100 and the server 300 may each transmit an authentication request to an external device in the information processing system 1000.

Figure 16:
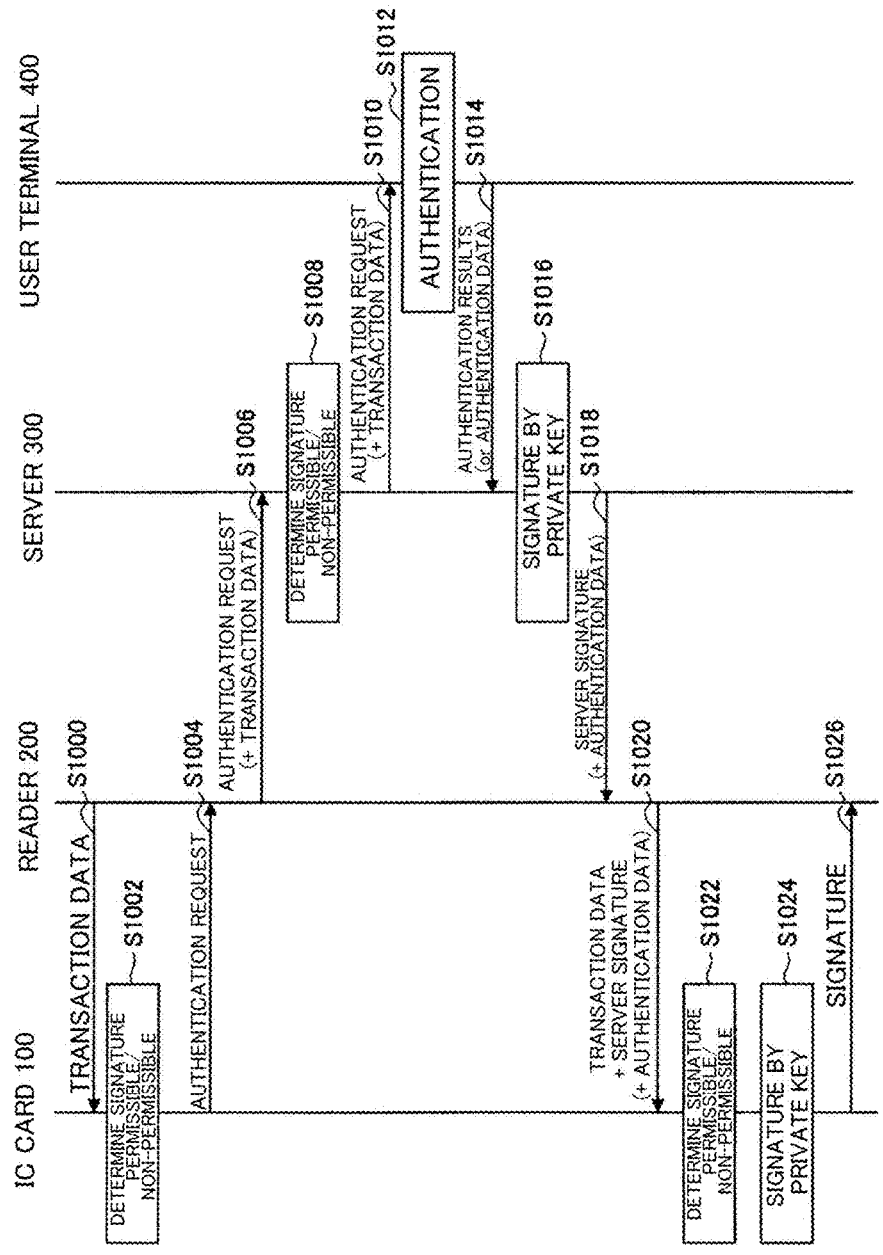
FIG. 16 is an explanatory diagram illustrating a fifth example of processing in the information processing system according to the present embodiment.

FIG. 16 is an explanatory diagram illustrating a fifth example of processing in the information processing system according to the present embodiment.

The reader 200 transmits transaction data (S1000).

The IC card 100 that receives the transaction data transmitted from the reader 200 in step S1000 determines whether signature conditions are satisfied, in the same way as with the processing at the IC card 100 in the third example, for example (S1002).

In a case in which determination is not made in step S1002 that signature conditions are satisfied, the IC card 100 transmits an authentication request to the reader 200 (S1004).

The reader 200 that receives the authentication request transmitted from the IC card 100 in step S1004 transmits the authentication request to the server 300 (S1006). At this time, the reader 200 may further transmit the transaction data to the server 300.

The server 300 that receives the authentication request transmitted from the reader 200 in step S1006 determines whether signature conditions are satisfied, in the same way as with the processing at the server 300 in the fourth example, for example (S1008).

In a case in which determination is not made in step S1008 that signature conditions are satisfied, the server 300 transmits an authentication request the user terminal 400 (S1010). At this time, the server 300 may further transmit the transaction data to the user terminal 400.

The user terminal 400 that receives the authentication request transmitted from the server 300 in step S1010 performs authentication in the same way as in step S904 in FIG. 15, for example (S1012). The user terminal 400 then transmits the authentication results to the server 300 (S1014). At this time, the user terminal 400 may further transmit authentication data corresponding to the authentication (e.g., signature data or the like) to the server 300.

The server 300 that receives the transmission results transmitted from the user terminal 400 in step S1014 generates signature data corresponding to the server 300 in a case in which the authentication results indicate that authentication was successful (S1016), and transmits the generated signature data to the reader 200 (S1018), in the same way as in step S908 in FIG. 15, for example. At this time, the server 300 may further transmit authentication data acquired from the user terminal 400 to the reader 200.

The reader 200 that receives the signature data corresponding to the server 300, transmitted from the server 300 in step S1018, transmits the transaction data. and the signature data corresponding to the server 300 to the IC card 100 (S1020). At this time, the reader 200 may further transmit authentication data acquired from the user terminal 400 to the IC card 100.

The IC card 100 that receives the data transmitted from the reader 200 in step S1020 determines whether signature conditions are satisfied, in the same way as in step S816 in FIG. 14, for example (S1022). In a case of determining that signature conditions are satisfied in step S1022, the IC card 100 generates signature data in the same way as in step S818 in FIG. 14, for example (S1024). The IC card 100 then transmits data including the generated signature data to the reader 200 (S1026).

The processing illustrated in FIG. 16, for example, is performed in the information processing system 1000 as processing according to the fifth example.

Note that processing according to the fifth example in the information processing system 1000 is not limited to the example illustrated in FIG. 16. For example, the IC card 100 may transmit a plurality of authentication requests, requesting authentication by each of a plurality of external devices, to the reader 200. In a case of the IC card 100 transmitting a plurality of authentication requests, the IC card 100 selectively generates signature data on the basis of verification results of a plurality of pieces of authentication data corresponding to each of the plurality of authentication requests. At this time, the IC card 100 may generate signature data in a case in which all pieces of authentication data corresponding to the plurality of authentication requests are verified, or may generate signature data in a case in which part of authentication data corresponding to the plurality of authentication requests is verified.

[2-6] Sixth Example of Processing in Information Processing System

In the information processing system 1000, "processing combining two or more processing of the processing according to the first example in the information processing system 1000 through the processing according to the fifth example in the information processing system 1000 that can be combined" may be performed.

As one example, in the information processing system 1000, "processing combining one of the processing according to the third example in the information processing system 1000 through the processing according to the fifth example in the information processing system 1000 with the processing according to the second example in the information processing system 1000" may be performed. In this case, effects in a case in which falsification/tampering of the contents of object data is performed can be reduced at the IC card 100, and also optional object data can be flexibly handled by a program corresponding to the object data being executed.

[2-7] Other Examples of Processing in Information Processing System

Note that processing in the information processing system 1000 is not limited to the processing according to the first example in the information processing system 1000 through the processing according to the sixth example in the information processing system 1000. For example, processing indicated by the following (a) and (b) may further be performed in the information processing system 1000, in addition to each of the processing according to the first example in the information processing system 1000 through the processing according to the sixth example in the information processing system 1000.

(a) For example, in a case in which the IC card 100 and the server 300 illustrated in FIG. 1 perform communication, via the reader 200 or directly, the IC card 100 and the server 300 may first perform mutual authentication using a predetermined method such as common key cryptography, and perform communication relating to exchange of various types of data following the mutual authentication being successfully completed. In this case, the server 300 with which mutual authentication has been completed successfully corresponds to the device trusted in advance as viewed from the IC card 100.

That is to say, in a case of performing communication relating to exchange of various types of data following the mutual authentication being successfully completed, the IC card 100 can perform processing relating to object data such as in the above-described examples of processing relating to transaction data using communication with a trusted device.

Accordingly, in a case of performing communication relating to exchange of various types of data following the mutual authentication being successfully completed, processing in the information processing system 1000 can be made to be processing that is more secure.

Also, "performing mutual authentication using common key cryptography, and performing communication relating to exchange of various types of data following the mutual authentication being successfully completed" is implemented in communication by Type-F NFC, for example. Accordingly, it is conceivable that implementation of a system, in which communication relating to exchange of various types of data is performed following mutual authentication being successfully completed, in the information processing system 1000, can be realized relatively easily.

(b) In a case in which communication relating to exchange of various types of data is performed following mutual authentication between the IC card 100 and the server 300 being successfully completed, as in the above (a), the server 300 may selectively perform processing relating to the IC card 100, on the basis of the ID of the IC card 100 acquired from the IC card 100.

An example of the ID of the IC card 100 is a unique ID of the IC card 100, such as a manufacturing ID or the like. Note that the ID of the IC card 100 may be an ID that a service provider that provides a service that the IC card 100 supports has assigned to the IC card 100.

The server 300 determines whether or not the IC card 100 is an object of executing processing, on the basis of, for example, the acquired ID of the IC card 100 and "a table (or database) storing the ID of the IC card 100 and data (e.g., a flag) indicating permission/non-permission of execution of processing in a correlated manner". Contents of data indicating permission/non-permission of execution of processing is changed by, for example, the user of the IC card 100 applying for permission/non-permission to an administrator managing the server 300 (e.g., a provider or the like that provides services).

In a case of determining that the IC card 100 is an object of executing processing, the server 300 performs processing relating to the IC card 100. In a case of not determining that the IC card 100 is an object of executing processing, the server 300 does not perform processing relating to the IC card 100.

Account control of the IC card 100 using the ID of the IC card 100 is realized by selectively performing processing relating to the IC card 100, as described above, for example.

Also, in a case in which data relating to the user of the IC card 100 is further stored in a correlated manner in the table in which the ID of the IC card 100 is stored, the server 300 can further perform notification to the user. Data relating to the user includes data indicating contacts, such as email addresses and SNS accounts and so forth, for example.

As one example, in a case in which communication is performed with the IC card 100 in a state in which execution of processing relating to the IC card 100 is restricted by application made by the user of the IC card 100, the server 300 does not execute processing relating to the IC card 100 and notifies a contact indicated by data relating to the user that the IC card 100 has been used. The user of the IC card 100 can recognize that the IC card. 100 has been unauthorizedly used by notification being performed as described above.

2. PROGRAM ACCORDING TO PRESENT EMBODIMENT

[I] Program Causing to Function as IC Card According to Present Embodiment

Generating signature data corresponding to object data that is the object of recording in a P2P database while preventing leakage of key information can be realized by a processor or the like in a computer executing a program (e.g., a program capable of realizing the functions of the processing unit 110) causing the computer to function as the IC card according to the present embodiment.

Also, advantages yielded by processing in the information processing system 1000 according to the examples described above can be yielded, by a processor or the like in a computer executing a program causing the computer to function as the IC card according to the present embodiment.

[II] Program Causing to Function as Server (Information Processing Device) According to Present Embodiment Advantages yielded by processing in the information processing system 1000 according to the examples to which the above-described server 300 relates can be yielded, by a processor or the like in a computer executing a program (e.g., a program capable of realizing the functions of a control unit that the server 300 has) causing the computer to function as the server (information processing device) according to the present embodiment.

Although a preferred embodiment of the present disclosure has been described above in detail with reference to the attached Figures, the technical scope of the present disclosure is not limited to this example. It is apparent that one possessing ordinary knowledge in the technical field of the present disclosure will be able to arrive at various types of variations and modifications within the scope of technical ideas set forth in the Claims, and it should be understood that these also belong to the technical scope of the present disclosure as a matter of course.

For example, an arrangement has been described above in which a program (computer program) for causing a computer to function as the IC card according to the present embodiment is provided, but in the present embodiment, a recording medium in which the above program is stored can also be provided.

The above-described configuration shows an example of the present embodiment, and belongs to the technical scope of the present disclosure as a matter of course.

Also, advantages described in the present specification are only descriptive or exemplary, and are not limiting. That is to say, the technology according to the present disclosure may yield other advantages that will be apparent to one skilled in the art from the description of the present specification, along with the above-described advantages, or instead of the above-described advantages.

Note that the following configurations also belong to the technical scope of the present disclosure.

(1) An IC card, including
a communication unit that performs communication with an external device; a storage unit that has tamper resistance, and that stores key information indicating a private key forming a pair with a public key or a seed value for generating the private key, and
a processing unit that, on the basis of object data to be recorded in a P2P database acquired from the external device by communication at the communication unit, and the private key corresponding to the key information, performs control to generate signature data corresponding to the object data, and transmits data including the generated signature data to the external device by communication at the communication unit.

(2) The IC card according to the above (1), wherein
a program relating to generation of the signature data, or a program relating to generation of the private key and generation of the signature data, is stored in the storage unit that has tamper resistance or in a storage unit that does not have tamper resistance, and the processing unit decides the program corresponding to the object data, and executes the program that is decided, thereby generating the signature data.

(3)

The IC card according to the above (1) or (2) wherein the processing unit determines whether a signature condition that is set is satisfied, and in a case of determining that the signature condition is satisfied, generates the signature data.

(4)

The IC card according to the above (3), wherein the signature condition includes a first signature condition relating to content indicated by the object data, and the processing unit determines whether the first signature condition is satisfied on the basis of the object data, and in a case of determining that the first signature condition is satisfied, generates the signature data.

(5)

The IC card according to the above (4), wherein history information indicating history of generating the signature data is stored in the storage unit that has tamper resistance or a storage unit that does not have tamper resistance, and the processing unit further determines whether the first signature condition is satisfied, on the basis of the history information.

(6)

The IC card according to the above (5), wherein, in a case of generating the signature data, the processing unit records the history information corresponding to the generated signature data in the storage unit that has tamper resistance or a storage unit that does not have tamper resistance.

(7)

The IC card according to any one of the above (4) to (6), wherein, in a case of not determining that the first signature condition is satisfied, the processing unit performs control to transmit data indicating an error in generating the signature data to the external device by communication at the communication unit.

(8)

The IC card according to any one of the above (4) to (6), wherein the signature condition further includes a second signature condition relating to predetermined authentication, and the processing unit determines, in a case of not determining that the first signature condition is satisfied, whether the second signature condition is satisfied on the basis of data acquired from the external device by communication at the communication unit, generates the signature data in a case of determining that the second signature condition is satisfied, and performs control to transmit an authentication request requesting the predetermined authentication to the external device by communication at the communication unit, in a case of not determining that the second signature condition is satisfied.

(9)

The IC card according to any one of the above (4) to (8), wherein the object data is transaction data of virtual currency, and the first signature condition includes one of, or a combination of, that a monetary amount of the virtual currency indicated by a transaction content of the transaction data is not more than an upper limit value, or the monetary amount of the virtual currency indicated by the transaction content is smaller than the upper limit value, that a total value of a monetary amount of the virtual currency transacted within a predetermined period is not more than an upper limit value, or the total value is smaller than the upper limit value, and that the number of transactions within a predetermined period is not more than an upper limit value, or the number of transactions is smaller than the upper limit value.

(10)

The IC card according to the above (3), wherein the signature condition includes a second signature condition relating to predetermined authentication, and the processing unit determines whether the second signature condition is satisfied on the basis of data acquired from the external device by communication at the communication unit, and generates the signature data in a case of determining that the second signature condition is satisfied.

(11)

The IC card according to the above (10), wherein, in a case of not determining that the second signature condition is satisfied, the processing unit performs control to transmit data indicating an error in generating the signature data to the external device by communication at the communication unit.

(12)

The IC card according to the above (10), wherein, in a case of not determining that the second signature condition is satisfied, the processing unit performs control to transmit an authentication request requesting the predetermined authentication to the external device by communication at the communication unit.

(13)

The IC card according to any one of the above (1) to (12), wherein the object ata is transaction data of virtual currency.

(14)

The IC card according to any one of the above (1) to (13), wherein the communication unit performs wireless communication with an external device.

(15)

The IC card according to the above (14), wherein the wireless communication is communication by NFC (Near Field Communication).

(16)

The IC card according to any one of the above (1) to (13), wherein the communication unit performs wired communication with an external device.

(17)

The IC card according to the above (16), wherein the wired communication is contact communication via an external contact terminal.

(18)

A processing method executed by an IC card, the method including a step of performing communication with an external device, a step of generating, on the basis of object data to be recorded in a P2P database acquired from the external device by communication in the step of performing communication, and a private key corresponding to key information indicating the private key forming a pair with a public key or a seed value for generating the private key that is stored in a storage medium that has tamper resistance, signature data corresponding to the object data, and a step performing control to transmit data including the signature data generated in the step of generating, to the external device, by communication in the step of performing communication.

(19)

An information processing system, including an IC card, and an information processing device that verifies content of object data to be recorded in a P2P database, and generates predetermined signature data in accordance with a verification result, wherein the IC card includes a communication unit that performs communication with an external device, a storage unit that has tamper resistance, and that stores key information indicating a private key forming a pair with a public key or a seed value for generating the private key, and a processing unit that, on the basis of the object data acquired from the external device by communication at the communication unit, and the private key corresponding to the key information, performs control to generate signature data corresponding to the object data, and transmits data including the generated signature data to the external device by communication at the communication unit, and the processing unit determines whether a signature condition relating to verification of the predetermined signature data corresponding to the information processing device is satisfied, and generates the signature data corresponding to the object data in a case of determining that the signature condition is satisfied.

REFERENCE SIGNS LIST

10 200 Reader
100 IC card
102 Communication unit
104 Storage unit
106 Control unit
110 Processing unit
300 Server
400 User terminal
1000 Information processing system

The invention claimed is:

1. An integrated circuit card, comprising:
a recording medium having tamper resistance and configured to store key information indicating a private key forming a pair with a public key or a seed value for generating the private key; and
circuitry configured to
perform communication with a reader,
perform, on a basis of object data to be recorded in a P2P database acquired from the communication with the reader, control to generate signature data corresponding to the object data by applying the object data to the private key,
transmit data including the generated signature data to the reader by the communication with the reader,
determine whether a first signature condition relating to content indicated by the object data is satisfied,
determine whether a second signature condition related to predetermined authentication is satisfied based on a determination that the first signature condition is not satisfied and data acquired from the communication with the reader, and
generate the signature data based on a determination that only one of the first signature condition or the second signature condition is satisfied.

2. The integrated circuit card according to claim 1, wherein
a program relating to generation of the signature data, or a program relating to generation of the private key and generation of the signature data, is stored in the recording medium having tamper resistance or in a recording medium not having tamper resistance, and
the circuitry is further configured to decide the program corresponding to the object data, and execute the program that is decided, thereby generating the signature data.

3. The integrated circuit card according to claim 1, wherein
history information indicating history of generating the signature data is stored in the recording medium having tamper resistance or a recording medium not having tamper resistance, and
the circuitry is further configured to determine whether the first signature condition is satisfied, on a basis of the history information.

4. The integrated circuit card according to claim 3, wherein,
in a case of generating the signature data, the circuitry is further configured to record the history information corresponding to the generated signature data in the recording medium having tamper resistance or a recording medium not having tamper resistance.

5. The integrated circuit card according to claim 1, wherein,
in a case of not determining that the first signature condition is satisfied, the circuitry is further configured to perform control to transmit data indicating an error in generating the signature data to the reader by the communication with the reader.

6. The integrated circuit card according to claim 1, wherein
the circuitry is further configured to
perform control to transmit an authentication request requesting the predetermined authentication to the reader by the communication with the reader, in a case of not determining that the second signature condition is satisfied.

7. The integrated circuit card according to claim 1, wherein
the object data includes transaction data of virtual currency, and
the first signature condition includes one of, or a combination of,
that a monetary amount of the virtual currency indicated by a transaction content of the transaction data is not more than an upper limit value, or the monetary amount of the virtual currency indicated by the transaction content is smaller than the upper limit value,
that a total value of a monetary amount of the virtual currency transacted within a predetermined period is not more than an upper limit value, or the total value is smaller than the upper limit value, and that a number of transactions within a predetermined period is not more than an upper limit value, or the number of transactions is smaller than the upper limit value.

8. The integrated circuit card according to claim 1, wherein,
in a case of not determining that the second signature condition is satisfied, the circuitry is further configured to perform control to transmit data indicating an error in generating the signature data to the reader by the communication with the reader.

9. The integrated circuit card according to claim 1, wherein,
in a case of not determining that the second signature condition is satisfied, the circuitry is further configured to perform control to transmit an authentication request requesting the predetermined authentication to the reader by the communication with the reader.

10. The integrated circuit card according to claim 1, wherein the object data includes transaction data of virtual currency.

11. The integrated circuit card according to claim 1, wherein the circuitry performs wireless communication with the reader.

12. The integrated circuit card according to claim 11, wherein the wireless communication is communication by NFC (Near Field Communication).

13. The integrated circuit card according to claim 1, wherein the circuitry performs wired communication with the reader.

14. The integrated circuit card according to claim 13, wherein the wired communication is contact communication via an external contact terminal.

15. The integrated circuit card according to claim 1, wherein the circuitry is further configured to
generate, after a determination that the first signature condition relating to content indicated by the object data is not satisfied and a determination that the second signature condition related to predetermined authentication is not satisfied, the signature data only based on a determination that both the first signature condition and the second signature condition is satisfied.

16. A processing method executed by an integrated circuit card, the method comprising:
performing communication with a reader;
generating, on a basis of object data to be recorded in a P2P database acquired from the reader by communication in the performing of communication with the reader, signature data corresponding to the object data by applying the object data to a private key stored in a recording medium having tamper resistance and storing key information indicating the private key forming a pair with a public key or a seed value for generating the private key;
transmitting data including the signature data to the reader;
determining whether a first signature condition relating to content indicated by the object data is satisfied;
determining whether a second signature condition related to predetermined authentication is satisfied based on a determination that the first signature condition is not satisfied and data acquired from the reader; and
generating the signature data based on a determination that only one of the first signature condition or the second signature condition is satisfied.

17. An information processing system, comprising:
an integrated circuit card; and
an information processing device configured to verify content of object data to be recorded in a P2P database, and generate predetermined signature data in accordance with a verification result, wherein
the integrated circuit card includes
a recording medium having tamper resistance and configured to store key information indicating a private key forming a pair with a public key or a seed value for generating the private key, and
circuitry configured to
perform communication with a reader,
perform, on a basis of the object data acquired from the communication with the reader, control to generate signature data corresponding to the object data by applying the object data to the private key,
transmit data including the generated signature data to the reader by the communication with the reader,
determine whether a first signature condition relating to content indicated by the object data is satisfied,
determine whether a second signature condition related to predetermined authentication is satisfied based on a determination that the first signature condition is not satisfied and data acquired from the communication with the reader, and
generate the signature data based on a determination that only one of the first signature condition is satisfied or the second signature condition is satisfied.

* * * * *